United States Patent
Itoh et al.

(10) Patent No.: US 11,274,682 B2
(45) Date of Patent: Mar. 15, 2022

(54) HYDRAULIC DRIVING APPARATUS

(71) Applicant: Hitachi Construction Machinery Co., Ltd., Tokyo (JP)

(72) Inventors: Kazuhiro Itoh, Tsuchiura (JP); Kazuhiro Numaguchi, Sakuragawa (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 17/276,722

(22) PCT Filed: Nov. 22, 2019

(86) PCT No.: PCT/JP2019/045812
§ 371 (c)(1),
(2) Date: Mar. 16, 2021

(87) PCT Pub. No.: WO2020/110946
PCT Pub. Date: Jun. 4, 2020

(65) Prior Publication Data
US 2022/0034067 A1   Feb. 3, 2022

(30) Foreign Application Priority Data

Nov. 29, 2018   (JP) .............................. JP2018-223851

(51) Int. Cl.
| F15B 13/02 | (2006.01) |
| E02F 9/22 | (2006.01) |
| F15B 11/17 | (2006.01) |

(52) U.S. Cl.
CPC .......... *F15B 13/029* (2013.01); *E02F 9/2235* (2013.01); *E02F 9/2267* (2013.01);
(Continued)

(58) Field of Classification Search
CPC ......... E02F 9/225; E02F 9/2253; F15B 11/17; F15B 13/029; F15B 2211/50581
See application file for complete search history.

(56) References Cited

U.S. PATENT DOCUMENTS

| 4,171,054 A * | 10/1979 | Tanaka .................... E02F 3/964 |
| | | 212/288 |
| 5,113,894 A * | 5/1992 | Yoshida .............. F15B 13/0407 |
| | | 137/106 |

(Continued)

FOREIGN PATENT DOCUMENTS

| JP | 8-145008 A | 6/1996 |
| JP | 8-277547 A | 10/1996 |

(Continued)

OTHER PUBLICATIONS

International Search Report (PCT/ISA/210) issued in PCT Application No. PCT/JP2019/045812 dated Feb. 10, 2020 with English translation (five (5) pages).

(Continued)

*Primary Examiner* — Thomas E Lazo
(74) *Attorney, Agent, or Firm* — Crowell & Moring LLP

(57) ABSTRACT

A counter balance valve (71L) is located between a directional control valve (23) and a hydraulic motor (32L) and provided on the way of a pair of supply/discharge lines (25A, 25B). The counter balance valve (71L) allows a spool (72L) to be displaced axially based on a pressure difference between the supply/discharge lines (25A, 25B). The counter balance valve (71L) includes a communicating passage (73L) for communicating the supply/discharge lines (25A, 25B) when the displacement of the spool (72L) exceeds a predetermined amount ($X_{CM}$), based on a pressure difference between the supply/discharge lines (25A, 25B). The (Continued)

communicating passage (73L) is provided in the spool (72L) of the counter balance valve (71L).

3 Claims, 12 Drawing Sheets

(52) U.S. Cl.
CPC .......... *E02F 9/2285* (2013.01); *E02F 9/2296* (2013.01); *F15B 11/17* (2013.01); *F15B 2211/20576* (2013.01); *F15B 2211/30525* (2013.01); *F15B 2211/50581* (2013.01)

(56) References Cited

U.S. PATENT DOCUMENTS

| | | | | |
|---|---|---|---|---|
| 5,331,812 | A | * | 7/1994 | Imai ...................... F16H 61/433 60/450 |
| 6,029,689 | A | * | 2/2000 | Arai ..................... F15B 11/0445 137/106 |
| 9,382,925 | B2 | * | 7/2016 | Lacher .................. F16H 61/421 |
| 9,695,842 | B2 | * | 7/2017 | Akiyama ................ F15B 21/14 |
| 2003/0167660 | A1 | * | 9/2003 | Kondou .................. E02F 9/225 37/348 |
| 2015/0013320 | A1 | | 1/2015 | Akiyama et al. |

FOREIGN PATENT DOCUMENTS

| | | | |
|---|---|---|---|
| JP | 08277547 A | * | 10/1996 |
| JP | 2005-119619 A | | 5/2005 |
| JP | 2014-20431 A | | 2/2014 |

OTHER PUBLICATIONS

Japanese-language Written Opinion (PCT/ISA/237) issued in PCT Application No. PCT/JP2019/045812 dated Feb. 10, 2020 (three (3) pages).

* cited by examiner

Driving Pressure PR>PL
Communication Flow Amount QtR>QtL
Rotational Speed RR≒RL

Rotational Speed RR>RL
Driving Pressure PR>PL

# HYDRAULIC DRIVING APPARATUS

TECHNICAL FIELD

The present disclosure relates to a hydraulic driving apparatus used with a construction machine such as a hydraulic excavator with a hydraulic motor, for example.

BACKGROUND ART

A hydraulic excavator is generally configured, as a typical construction machine, to include an upper revolving structure mounted rotatably on a lower traveling structure and a working mechanism provided capable of moving upward/downward on the upper revolving structure. The lower traveling structure is configured to include an endless crawler belt and right and left traveling driving apparatuses with a hydraulic motor driving the crawler belt to circle, for example. Herein, the rotational speed R of a traveling driving apparatus can be expressed by the following Formula 1, using a delivery flow amount Qp of a hydraulic pump and a capacity Vm of a hydraulic motor. The index "p" denotes a pump, while the index "m" denotes a motor.

$$R = K \cdot \frac{Qp}{Vm} \quad \text{[Formula 1]}$$

($K$ : proportionality coefficient)

Therefore, the rotational speed RL of the left traveling driving apparatus is determined by a delivery flow amount Qp1 of one hydraulic pump supplying pressurized oil to the left traveling driving apparatus (hereafter also referred to as "pump delivery flow amount Qp1") and a capacity VmL of a hydraulic motor in the left traveling driving apparatus (hereafter also referred to as "motor capacity VmL"). Also, the rotational speed RR of the right traveling driving apparatus is determined by a delivery flow amount Qp2 of the other hydraulic pump supplying pressurized oil to the right traveling driving apparatus (hereafter also referred to as "pump delivery flow amount Qp2") and a capacity VmR of a hydraulic motor in the right traveling driving apparatus (hereafter also referred to as "motor capacity VmR"). Thus, a difference between the rotational speed RL of the left traveling driving apparatus and the rotational speed RR of the right traveling driving apparatus may be generated by the pump delivery flow amounts Qp1, Qp2 and the motor capacities VmL, VmR. In this specification and its appended drawings, suffixes "L" and "R" to a variable or symbol may denote "left" and "right", respectively, to make a distinction between left and right components.

In fact, a hydraulic excavator can mistrack on the level ground when a difference between the rotational speeds RL, RR of the right and left traveling driving apparatuses occurs. A typical solution for preventing such a mistracking of a hydraulic excavator may be synchronization of the rotational speeds RL, RR of the left and right traveling driving apparatuses to make a straight traveling correction. For instance, Patent Document 1 discloses an art for making a straight traveling correction by installing a bleed-off circuit making a straight traveling correction having a variable throttle on the way of a circuit supplying pressurized oil to a traveling hydraulic motor.

PRIOR ART DOCUMENT

Patent Document

Patent Document 1: Japanese Patent Laid-Open No. 2005-119619 A

SUMMARY OF THE INVENTION

The art described in Patent Document 1 fails to provide a sufficient effect of making a straight traveling correction for a traveling driving apparatus because the apparatus is unsuccessfully controlled or adjusted to achieve a smaller orifice of the apparatus on the low revolution side during zigzag movement or the like due to its constant orifice opening setting in operation. According to the art in Patent Document 1, since inlet and outlet oil passages of the traveling driving apparatus are connected to a bleed-off circuit, a constant flow amount of pressurized oil normally returns to a tank irrespective of the state of traveling, and the efficiency can decline. Furthermore, the art in Patent Document 1 can generate reverse flow of oil liquids on the motor drain circuit side due to pressure loss in a drain pipe in the center joint when a bleed-off circuit is installed near the traveling driving apparatuses. In this case, the pressure in the motor drain can increase, leading to degraded durability of a motor seal. Moreover, throttle calibration is needed and it can be laborious. A bleed-off circuit and a communication pipe must additionally be installed, which can bring about higher operational costs. A constant oil flow can affect brake and starting performance when a communicating oil passage is provided inside of a traveling driving apparatus. Moreover, a traveling driving apparatus can be larger if additional parts are installed inside of the traveling driving apparatus.

One embodiment of the present invention has an object to provide a hydraulic driving apparatus capable of suppressing mistracking attributed to a difference in rotational speed between the left traveling driving apparatus (first hydraulic motor) and the right traveling driving apparatus (second hydraulic motor) with proper timing.

The embodiment of the present invention provides a hydraulic driving apparatus including: a first hydraulic pump and a second hydraulic pump; a first hydraulic motor rotatively driven by pressurized oil from the first hydraulic pump; a second hydraulic motor rotatively driven by pressurized oil from the second hydraulic pump; a pair of first and second supply/discharge passages connecting the first hydraulic pump, a hydraulic oil tank and the first hydraulic motor; a pair of third and fourth supply/discharge passages connecting the second hydraulic pump, the hydraulic oil tank and the second hydraulic motor; a first directional control valve provided on the way of the first and second supply/discharge passages and switching the direction of the pressurized oil supplied and discharged between the first hydraulic pump, the hydraulic oil tank and the first hydraulic motor; a second directional control valve provided on the way of the third and fourth supply/discharge passages and switching the direction of the pressurized oil supplied and discharged between the second hydraulic pump, the hydraulic oil tank and the second hydraulic motor; a first counter balance valve located between the first directional control valve and the first hydraulic motor, provided on the way of the first and second supply/discharge passages and allowing a first spool to be displaced axially based on a pressure difference between the first and second supply/discharge passages; and a second counter balance valve located between the second directional control valve and the second hydraulic motor, provided on the way of the third and fourth supply/discharge passages and allowing a second spool to be displaced axially based on a pressure difference between the third and fourth supply/discharge passages, in which the first counter balance valve includes a first communicating passage communicating the first and second supply/discharge passages when the displacement of the first spool exceeds a predetermined amount based on a pressure difference between the first and second supply/discharge passages, and the second counter balance valve includes a second communicating passage communicating the third and fourth supply/discharge passages when the displacement of the second spool exceeds a predetermined amount based on a pressure difference between the third and fourth supply/discharge passages.

The embodiment of the present invention can suppress mistracking based on a difference in rotational speed between a first hydraulic motor (for example, left traveling driving apparatus) and a second hydraulic motor (for example, right traveling driving apparatus) with proper timing.

MODE FOR CARRYING OUT THE INVENTION

One example of employing a hydraulic driving apparatus according to the embodiment of the present invention in a hydraulic driving apparatus (traveling hydraulic driving apparatus) of a construction machine (hydraulic excavator) will be described with reference to the attached drawings.

Figure 1:
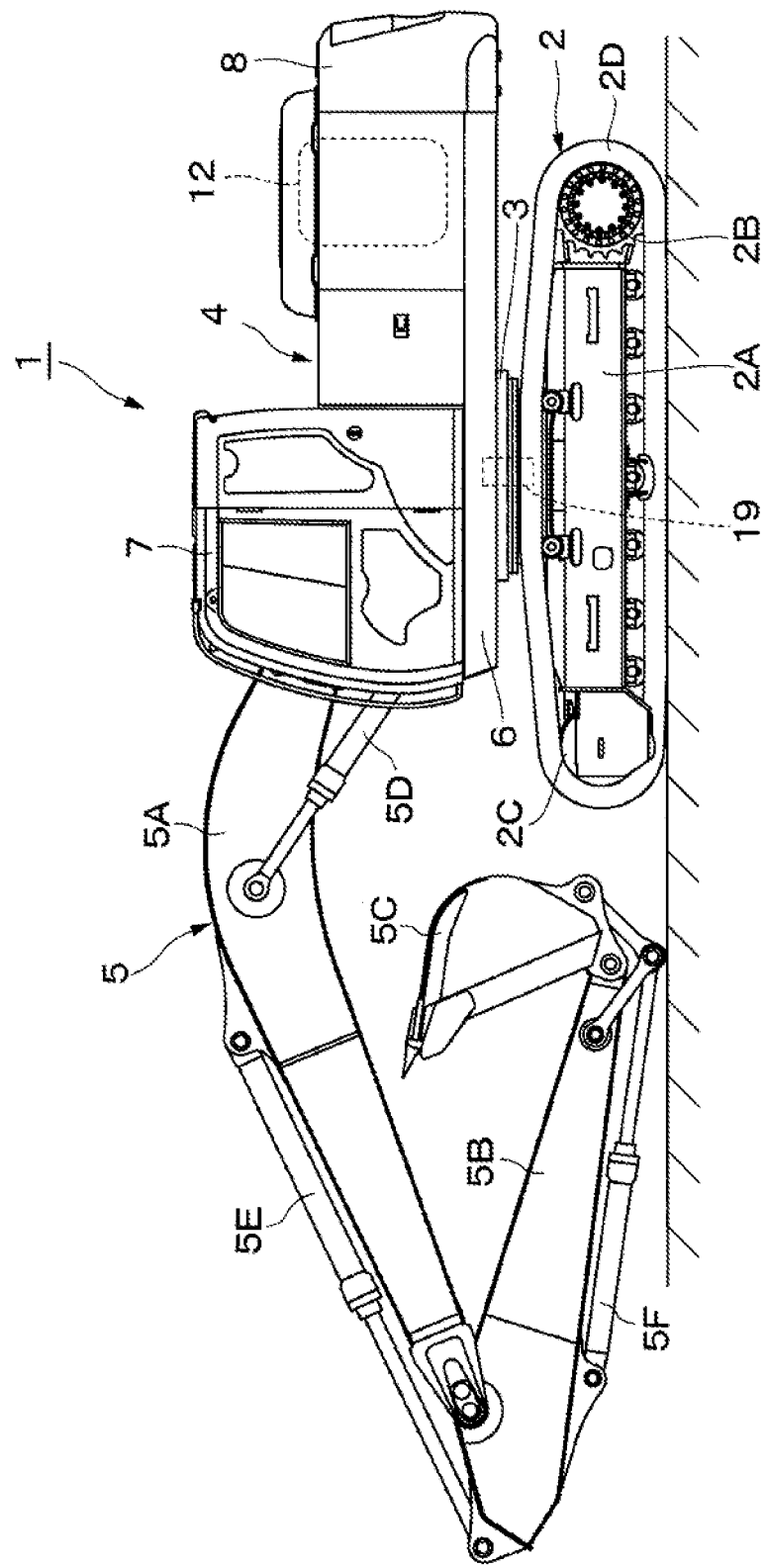
FIG. 1 is a front view of a hydraulic excavator according to the embodiment.

FIGS. 1 to 12 show embodiments of the present invention. In FIG. 1, a hydraulic excavator 1, as an exemplary construction machine (working vehicle), is configured by a self-propelled crawler type lower traveling structure 2, a revolving apparatus 3 mounted on the lower traveling structure 2, an upper revolving structure 4 mounted rotatably on the lower traveling structure 2 through the revolving apparatus 3, and a working device 5 composed of an articulated structure provided on a front side of the upper revolving structure 4 to perform excavating work.

At this time, the lower traveling structure 2 and the upper revolving structure 4 constitute a vehicle body of the hydraulic excavator 1. The working device 5, called as working machine or "front", is configured by a boom 5A, an arm 5B, a bucket 5C as a working tool, a boom cylinder 5D driving these parts, an arm cylinder 5E, and a bucket cylinder 5F as a working tool cylinder. The working device 5 can move upward/downward by extending or contracting the cylinders 5D, 5E, 5F, each as a hydraulic cylinder.

The lower traveling structure 2 is configured to include a truck frame 2A, drive wheels 2B provided on both the left and right sides of the truck frame 2A, idler wheels 2C provided on both the left and right sides of the truck frame 2A and opposite to the drive wheels 2B in a front-and-rear direction, and crawler belts 2D looped around the drive wheels 2B and the idler wheels 2C. The left and right drive wheels 2B (or the left and right crawler belts 2D) are driven by traveling hydraulic motors 32L, 32R of later-described left and right traveling driving apparatuses 31L, 31R (see FIG. 2).

The upper revolving structure 4 is mounted on the lower traveling structure 2 through the revolving apparatus 3 configured to include a revolving bearing, a revolving hydraulic motor, a reduction mechanism and the like. The upper revolving structure 4 is configured to include a revolving frame 6 that is to be a support structural body (base frame) of the upper revolving structure 4, a cab 7 mounted on the revolving frame 6, a counterweight 8 and the like. In this case, a later-described engine 12, hydraulic pumps 13, 14, 20, a hydraulic oil tank 15, a control valve device 22 (see FIG. 2) and the like are mounted on the revolving frame 6.

The revolving frame 6 is mounted on the lower traveling structure 2 through the revolving apparatus 3. The cab 7 with an operator's room thereinside is provided on a front left side of the revolving frame 6. The cab 7 is provided with an operator's seat for an operator to be seated in. An operating device 27 operating the hydraulic excavator 1, a tilting switch 60 (see FIG. 2) and the like are provided on the periphery of the operator's seat. The operating device 27 outputs a pilot signal (pilot pressure) corresponding to each operator's operation (lever operation, pedal operation) to a control valve device 22. As a result, the operator can operate (drive) traveling hydraulic motors 32L, 32R of traveling driving apparatuses 31L, 31R (see FIG. 2), cylinders 5D, 5E, 5F of the working device 5, and a revolving hydraulic motor of the revolving apparatus 3.

The cab 7 is provided with a later-described controller 61 see FIG. 2) located on a rear lower side of the operator's seat. Meanwhile, a counterweight 8 taking a weight balance with the working device 5 is provided on a rear end side of the revolving frame 6.

Subsequently, a hydraulic driving apparatus driving the hydraulic excavator 1 will be described with reference to FIG. 1, and FIGS. 2 to 12 as well.

Figure 2:
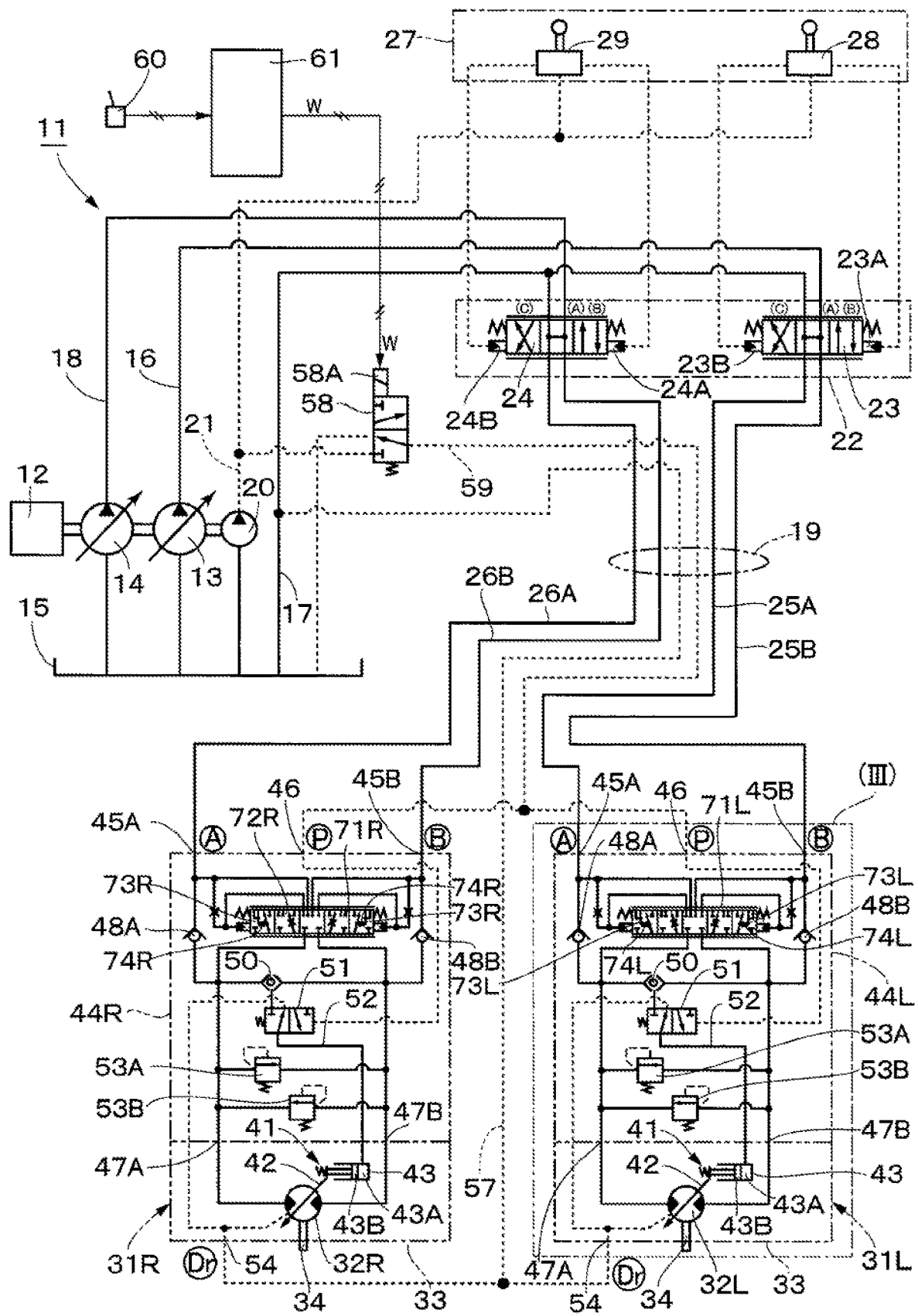
FIG. 2 is a hydraulic circuit diagram of the hydraulic excavator in FIG. 1.

As shown in FIG. 2, the hydraulic excavator 1 includes a hydraulic circuit 11 operating (driving) the hydraulic excavator 1 based on pressurized oil supplied from the hydraulic pumps 13, 14. The hydraulic circuit 11 that constitutes a hydraulic driving apparatus includes an engine 12, hydraulic pumps 13, 14, 20, a hydraulic oil tank 15, a center joint 19, a control valve device 22, an operating device 27, traveling driving apparatuses 31L, 31R, and a controller 61. The hydraulic circuit 11 in FIG. 2 mainly shows a circuit allowing the lower traveling structure 2 to travel (i.e., traveling hydraulic driving apparatus) to avoid complexity of the configuration in the figure. In other words, the hydraulic circuit 11 in FIG. 2 shows no circuit driving the working device 5 (i.e., working hydraulic driving apparatus) or circuit driving the revolving apparatus 3 (i.e., revolving hydraulic driving apparatus revolving the upper revolving structure 4 relative to the lower traveling structure 2).

The engine 12 is mounted on the revolving frame 6. The engine 12 is configured by an internal combustion engine such as a diesel engine, for example. The first hydraulic pump 13, the second hydraulic pump 14 and the pilot hydraulic pump 20 are mounted on an output side of the engine 12. These hydraulic pumps 13, 14, 20 are rotatively driven by the engine 12. A drive source (power source) driving hydraulic pumps 13, 14, 20 may be configured by the engine 12 alone as an internal combustion engine, and additionally for example, an engine and an electric motor, or an electric motor alone.

The first hydraulic pump 13 and the second hydraulic pump 14 (hereafter also referred to as hydraulic pumps 13, 14) are mechanically (i.e., power transmissibly) connected to the engine 12. The hydraulic pumps 13, 14 are main hydraulic pumps of the hydraulic circuit 11. The hydraulic pumps 13, 14 are configured by a swash plate type variable displacement, an inclined shaft type variable displacement or a radial piston type variable displacement hydraulic pump. The hydraulic pumps 13, 14 are connected to the traveling hydraulic motors 32L, 32R, the revolving hydraulic motor, and the cylinders 5D, 5E, 5F (hereafter also referred to as hydraulic actuators 5D-32R), each serving as a hydraulic actuator through the control valve device 22.

Herein, the first hydraulic pump 13 supplies pressurized oil to the traveling hydraulic motor 32L (hereafter also referred to as left traveling hydraulic motor 32L) of the traveling driving apparatus 31L (hereafter also referred to as left traveling driving apparatus 31L) on the left side of the hydraulic excavator 1. The first hydraulic pump 13 supplies pressurized oil to the revolving hydraulic motor, the boom cylinder 5D, and the arm cylinder 5E, for example (not shown). As shown in FIG. 2, the first hydraulic pump 13 discharges hydraulic oil stored in the hydraulic oil tank 15 as pressurized oil to the first delivery line 16. The pressurized oil discharged to the first delivery line 16 is supplied to the left traveling hydraulic motor 32L through the control valve device 22 and the center joint 19. The pressurized oil supplied to the left traveling hydraulic motor 32L is returned to the hydraulic oil tank 15 through the center joint 19, the control valve device 22 and a return line 17. The return of the pressurized oil allows the hydraulic oil to circulate.

Meanwhile, the second hydraulic pump 14 functions in the same manner as the first hydraulic pump 13. The second hydraulic pump 14 supplies pressurized oil to the traveling hydraulic motor 32R (hereafter also referred to as right traveling hydraulic motor 32R) of the traveling driving apparatus 31R (hereafter also referred to as right traveling driving apparatus 31R) on the right side of the hydraulic excavator 1. The second hydraulic pump 14 supplies pressurized oil to the boom cylinder 5D and the bucket cylinder 5F, for example (not shown). As shown in FIG. 2, the second hydraulic pump 14 discharges hydraulic oil stored in the hydraulic oil tank 15 as pressurized oil to the second delivery line 18. The discharge of the hydraulic oil allows the hydraulic oil to circulate.

The center joint 19 is provided between the lower traveling structure 2 and the upper revolving structure 4. The center joint 19 allows oil liquids (hydraulic oil, pressurized oil) to circulate between the upper revolving structure 4 and the lower traveling structure 2 irrespective of the revolution of the upper revolving structure 4 relative to the lower traveling structure 2.

The pilot hydraulic pump 20, as a pilot pump, is mechanically connected to the engine 12, as well as the hydraulic pumps 13, 14. The pilot hydraulic pump 20 is configured by a fixed displacement gear pump, for example. The pilot hydraulic pump 20 discharges hydraulic oil stored in the hydraulic oil tank 15 as pressurized oil into the pilot delivery line 21. That is, the pilot hydraulic pump 20 constitutes a pilot hydraulic power source together with the hydraulic oil tank 15.

The pilot hydraulic pump 20 supplies pressurized oil (hereafter also referred to as gear change pilot pressure) to tilting switching valves 51, 51 of the traveling hydraulic motors 32L, 32R through a later-described pilot pressure control valve 58. The pilot hydraulic pump 20 supplies pressurized oil (hereafter also referred to as operation pilot pressure) to (the directional control valves 23, 24 of) the control valve device 22 through (the traveling lever/pedal operating devices 28, 29 of) the operating device 27.

The control valve device 22 is a collection of control valves composed of a plurality of directional control valves 23, 24. The control valve device 22 in FIG. 2 mainly shows the traveling directional control valves 23, 24, or the left traveling directional control valve 23 and the right traveling directional control valve 24. In other words, the control valve device 22 in FIG. 2 shows no working directional control valves (directional control valve for boom, directional control valve for arm, directional control valve for bucket), or no revolving directional control valve. Likewise, the operating device 27 in FIG. 2 mainly shows traveling operating devices 28, 29, or the left traveling lever/pedal operating device 28 and the right traveling lever/pedal operating device 29. In other words, the operating device 27 in FIG. 2 describes no working lever operating device (left lever operating device, right lever operating device).

The control valve device 22 distributes the pressurized oil discharged from the hydraulic pumps 13, 14 to the hydraulic actuators 5D-32R. That is, the control valve device 22 controls the direction of the pressurized oil supplied from the hydraulic pumps 13, 14 to the hydraulic actuators 5D-32R in response to a switching signal (operation pilot pressure) by operating the operating device 27 disposed in the cab 7 (lever operation, pedal operation). As a result, the hydraulic actuators 5D-32R are driven by the pressurized oil (hydraulic oil) supplied (discharged) from the hydraulic pumps 13, 14.

Herein, the left traveling directional control valve 23 of the control valve device 22 is provided on the way of a pair of lines 25A, 25B, or on the way of the first left supply/discharge line 25A as a first supply/discharge passage (first left supply/discharge passage) and the second left supply/discharge line 25B as a second supply/discharge passage (second left supply/discharge passage). The first left supply/discharge line 25A and the second left supply/discharge line 25B connect between the first hydraulic pump 13, the hydraulic oil tank 15 and the left traveling hydraulic motor 32L. The left traveling directional control valve 23 is configured by a pilot operating directional control valve, for example, by a 4-port and 3-position (or a 6-port and 3-position) hydraulic pilot directional control valve. The left traveling directional control valve 23 switches between the supply and discharge of the pressurized oil relative to the left traveling hydraulic motor 32L between the first hydraulic pump 13 and the left traveling hydraulic motor 32L.

That is, the left traveling directional control valve as a first directional control valve switches the direction of the pressurized oil supplied and discharged between the first hydraulic pump 13, the hydraulic oil tank 15 and the left traveling hydraulic motor 32L. As a result, the left traveling directional control valve 23 forwards or reverses the left traveling hydraulic motor 32L. A switching signal based on the operation of the left traveling lever/pedal operating device 28 is supplied to the hydraulic pilot portions 23A, 23B of the left traveling directional control valve 23. As a result, the left traveling directional control valve 23 is switched from a neutral position (A) to switching positions (B), (C).

The right traveling directional control valve 24 of the control valve device 22 is provided on the way of a pair of lines 26A, 26B, or on the way of a first right supply/discharge line 26A as a third supply/discharge passage (first right supply/discharge passage) and a second right supply/discharge line 26B as a fourth supply/discharge passage (second right supply/discharge passage). The first right supply/discharge line 26A and the second right supply/discharge line 26B connect the second hydraulic pump 14, the hydraulic oil tank 15 and the right traveling hydraulic motor 32R. The right traveling directional control valve 24 as a second directional control valve switches the direction of the pressurized oil supplied and discharged between the second hydraulic pump 14, the hydraulic oil tank 15 and the right traveling hydraulic motor 32R as shown in the left traveling directional control valve 23. A switching signal based on the operation of a right traveling lever/pedal operating device 29 is supplied to the hydraulic pilot portions 24A, 24B of the right traveling directional control valve 24.

The operating device 27 includes traveling lever/pedal operating devices 28, 29 (hereafter also referred to as traveling operating devices 28, 29) each as a traveling operating device and a working lever operating device as a working operating device (not shown). The traveling operating devices 28, 29 are disposed in the cab 7 of the upper revolving structure 4, more specifically forward from the operator's seat. The working lever operating device is disposed on both right and left sides of the operator's seat. The traveling operating devices 28, 29 are configured by a lever/pedal type pressure reducing valve type pilot valve, for example. The pressurized oil from the pilot hydraulic pump 20 is supplied to the traveling operating devices 28, 29 through the pilot delivery line 21. The traveling operating devices 28, 29 output a switching signal corresponding to a lever operation or a pedal operation by the operator to the control valve device 22 (directional control valves 23, 24).

Herein, the left traveling operating device 28 switches the left traveling directional control valve 23. That is, the left traveling operating device 28, by an operator's operation, supplies (outputs) left traveling pilot pressure as operation pilot pressure (switching signal) in proportion with its operating amount to the hydraulic pilot portions 23A, 23B of the left traveling directional control valve 23. As a result, the switching position of the left traveling directional control valve 23 is switched. Meanwhile, the right traveling operating device 29 switches the right traveling directional control valve 24.

The left traveling driving apparatus 31L rotatively drives the left drive wheel 2B based on the pressurized oil supplied from the first hydraulic pump 13. The left traveling hydraulic motor 32L of the left traveling driving apparatus 31L is connected to the first hydraulic pump 13 and the hydraulic oil tank 15 through the first, second left supply/discharge lines 25A, 25B. The left traveling directional control valve 23 is provided on the way of the first, second left supply/discharge lines 25A, 25B.

Figure 3:
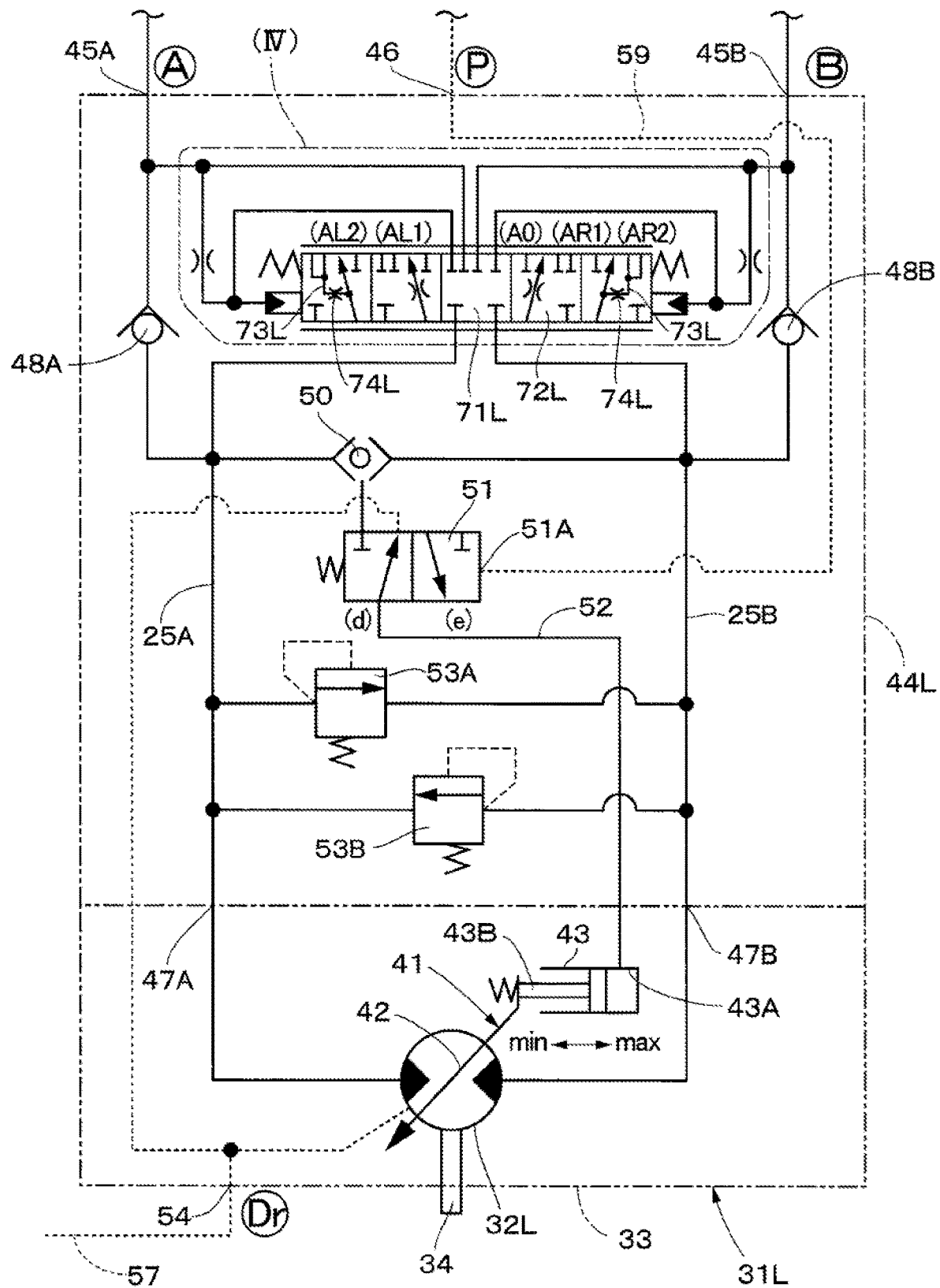
FIG. 3 is an enlarged hydraulic circuit diagram of a portion (III) in FIG. 2.
Figure 4:
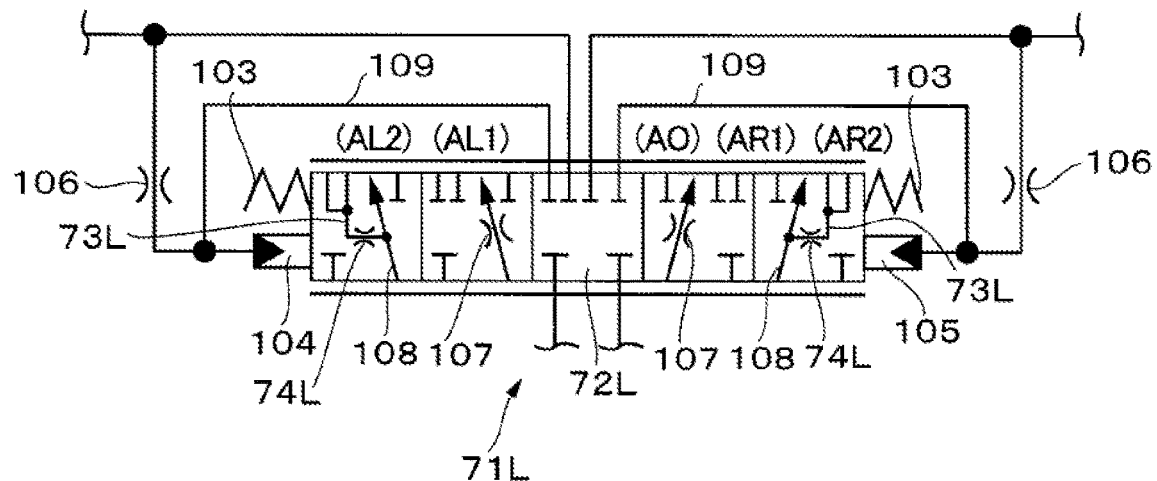
FIG. 4 is an enlarged hydraulic circuit diagram of a portion (IV) in FIG. 3.

As shown in FIG. 3, the left traveling driving apparatus 31L (hereafter simply referred to as traveling driving apparatus 31L) is configured by the left traveling hydraulic motor 32L (hereafter simply referred to as hydraulic motor 32L) and a left brake valve 44L (hereafter simply referred to as brake valve 44L). In this case, the traveling driving apparatus 31L is configured by connecting the brake valve 44L controlling the flow at an inlet port and an outlet port of the hydraulic motor 32L (motor ports 47A, 47B) to the hydraulic motor 32L rotatable in both directions by reversing an inlet port and an outlet port for pressurized oil.

The left traveling hydraulic motor 32L, as a first hydraulic motor, is rotatively driven by the pressurized oil from the first hydraulic pump 13. Herein, the hydraulic motor 32L is configured by a variable displacement hydraulic motor. More specifically, the hydraulic motor 32L is configured by a swash plate type axial piston hydraulic motor having a swash plate 42 as a displacement variable portion. The hydraulic motor 32L includes an output shaft 34 and a displacement variable mechanism 41, for example. The hydraulic motor 32L can rotate the output shaft 34 by the pressurized oil supplied from the hydraulic pump 13 and change the rotational speed of the output shaft 34 by the displacement variable mechanism 41.

The output shaft 34 is provided rotatably in a motor casing 33 forming an outer shell of the hydraulic motor 32L. The output shaft 34 is spline-coupled to a cylinder block (not shown) to rotate together with the cylinder block. A plurality of cylinders separated circumferentially and axially extending (not shown) are drilled in the cylinder block, and pistons (not shown) are slidably inserted within the cylinders. The pistons reciprocate within the cylinders by the rotation of the cylinder block. A valve plate (not shown) is provided between the motor casing 33 and the cylinder block. The valve plate includes a pair of supply/discharge ports intermittently communicating with each of the cylinders in the cylinder block. Each of the supply/discharge ports of the valve plate communicates with the supply/discharge lines 25A, 25B.

The displacement variable mechanism 41 is provided within the motor casing 33. The displacement variable mechanism 41 is configured to include the swash plate 42 as a displacement variable portion and a tilting actuator 43 as a displacement variable actuator. The displacement variable mechanism 41 changes the tilting angle of the swash plate 42 by the tilting actuator 43 to adjust the capacity of the pressurized oil supplied to each of the cylinders within the cylinder block and change the rotational speed and the output torque of the output shaft 34.

The swash plate 42 normally retains the large tilting position by the resultant force of pressing force acting from each of the pistons (resultant pressing force). On the other hand, the swash plate 42 tilts to the small tilting position by being pressed by the tilting actuator 43. In this case, increased stroke amounts of a piston (difference in stroke) allow the output shaft 34 to rotate at a high torque and low speed when the swash plate 42 is at the large tilting position. Meanwhile, decreased stroke amounts of a piston allow the supply flow amount required for the rotation of the hydraulic motor 32L (motor displacement) to decrease and the output shaft 34 to rotate at a low torque and high speed when the swash plate 42 is at a small tilting position.

The tilting actuator 43 drives the swash plate 42 of the hydraulic motor 32L to change the motor capacity. Herein, the tilting actuator 43 is configured by a tilting cylinder 43A provided in the motor casing 33 and a tilting piston 43B (servo piston) whose base end side is slidably inserted to the tilting cylinder 43A and whose tip end side is allowed to abut a back surface of the swash plate 42. The tilting actuator 43, depending on the pressurized oil supplied from the tilting switching valve 51 into the tilting cylinder 43A, allows the tilting piston 43B to press the back surface side of the swash plate 42 and the swash plate 42 to tilt between the large tilting position and the small tilting position to change the rotational speed of the output shaft 34.

As shown in FIG. 3, the brake valve 44L constitutes the traveling driving apparatus 31L together with the hydraulic motor 32L. The brake valve 44L includes a pair of valve ports 45A, 45B, a pilot pressure port 46, a pair of motor ports 47A, 47B, a pair of check valves 48A, 48B, a left counter balance valve 71L, a high-pressure selector valve 50, a tilting switching valve 51 as a displacement control valve, and a pair of relief valves 53A, 53B. The check valves 48A, 48B, the left counter balance valve 71L, the high-pressure selector valve 50, the tilting switching valve 51, and the relief valves 53A, 53B are provided integrally with the motor casing 33 of the hydraulic motor 32L, for example.

The valve ports 45A, 45B open to the motor casing 33, for example. The valve ports 45A, 45B are connected to the hydraulic pump 13 or the hydraulic oil tank 15, depending on the switching position of the directional control valve 23. The pilot pressure port 46 opens to the motor casing 33, for example. The pilot pressure port 46 is connected to the pilot hydraulic pump 20 or the hydraulic oil tank 15, depending on the switching position of the pilot pressure control valve 58. The motor ports 47A, 47B are connected to the supply/discharge ports of the valve plate of the hydraulic motor 32L.

The check valves 48A, 48B are located between the hydraulic motor 32L and the directional control valve 23 and provided on the way of the supply/discharge lines 25A, 25B. The check valves 48A, 48B are poppet type check valves. The check valves 48A, 48B are operated to allow the pressurized oil traveling from the valve ports 45A, 45B to the motor ports 47A, 47B to pass, and the pressurized oil traveling from the motor ports 47A, 47B to the valve ports 45A, 45B to be blocked.

The left counter balance valve 71L is provided on the way of the supply/discharge lines 25A, 25B so as to be in parallel with each of the check valves 48A, 48B. That is, the left counter balance valve 71L as a first counter balance valve (hereafter simply referred to as counter balance valve 71L) is located between the directional control valve 23 and the hydraulic motor 32L and provided on the way of the pair of supply/discharge lines 25A, 25B. The counter balance valve 71L allows the left spool 72L as a first spool (hereafter simply referred to as spool 72L) to be axially displaced based on a pressure difference between the supply/discharge lines 25A, 25B. That is, the counter balance valve 71L is almost in association with the directional control valve 23 based on a differential pressure between the supply/discharge lines 25A, 25B to switch the spool 72L. As a result, the counter balance valve 71L is closed during inertial rotation of the hydraulic motor 32L to generate brake pressure in the supply/discharge line 25A or the supply/discharge line 25B before and after the hydraulic motor 32L. The configuration of the left counter balance valve 71L (and a later-described right counter balance valve 71R) of the embodiment will be described later.

The high-pressure selector valve 50 is configured by a shuttle valve. The high-pressure selector valve 50 is located between the hydraulic motor 32L and the counter balance valve 71L and provided between the supply/discharge lines 25A, 25B. The high-pressure selector valve 50 selects the pressurized oil on the high pressure side in the supply/discharge lines 25A, 25B connected to the hydraulic motor 32L, and supplies selected pressurized oil to the tilting actuator 43 through the tilting switching valve 51.

The tilting switching valve 51 is installed between the high-pressure selector valve 50 and the tilting actuator 43. That is, the tilting switching valve 51 is provided on the way of an oil passage 52 connecting the high-pressure selector valve 50 and the tilting cylinder 43A of the tilting actuator 43. The tilting switching valve 51 switches the pressurized oil supplied to the tilting actuator 43. The tilting switching valve 51 is configured by a 3-port and 2-position hydraulic pilot switching valve (directional control valve) having a hydraulic pilot portion 51A. The tilting switching valve 51, in response to a pilot signal (gear change pilot pressure) supplied to the hydraulic pilot portion 51A, switches between a neutral position (d) connecting the oil passage 52 to a drain port 54 and a drive position (e) connecting the oil passage 52 to the high-pressure selector valve 50.

The supply of the pressurized oil from the high-pressure selector valve 50 to the tilting cylinder 43A is blocked, and the tilting cylinder 43A communicates with the drain port 54 when the tilting switching valve 51 is at the neutral position (d). As a result, the tilting piston 43B is inactive to suppress the pressing force acting on the swash plate 42, and the swash plate 42 retains the large tilting position (maximum motor tilting). Meanwhile, part of the pressurized oil traveling in the supply/discharge line 25A (25B) on the high pressure side selected by the high-pressure selector valve 50 in the supply/discharge lines 25A, 25B is supplied to the tilting cylinder 43A through the oil passage 52 when the tilting switching valve 51 is at the drive position (e). As a result, the tilting piston 43B is activated to press the swash plate 42 and the swash plate 42 retains the small tilting position (minimum motor tilting).

Transmission pilot pressure is supplied from the pilot pressure control valve 58 to the hydraulic pilot portion 51A of the tilting switching valve 51 through the pilot pressure port 46. Herein, the tilting switching valve 51 moves from the neutral position (d) to the drive position (e) and the motor tilting is minimum when the transmission pilot pressure required for switching the tilting switching valve 51 from the neutral position (d) to the drive position (e) acts on the hydraulic pilot portion 51A. On the other hand, the tilting switching valve 51 doesn't move to the drive position (e) and the motor tilting remains maximum when the transmission pilot pressure doesn't act on the hydraulic pilot portion 51A.

Relief valves 53A, 53B are located between the hydraulic motor 32L and the counter balance valve 71L and provided on the way of the supply/discharge lines 25A, 25B. The relief valves 53A, 53B open when the brake pressure generated in the supply/discharge line 25A or the supply/discharge line 25B increases to a predetermined set pressure during inertial rotation of the hydraulic motor 32L and relieves the resulting excessive pressure.

That is, the relief valves 53A, 53B are installed to protect the traveling driving apparatus 31L. The relief valves 53A, 53B discharge the pressurized oil to one motor port 47B (47A) when the motor port pressure of the other motor port 47A (47B) in a pair of motor ports 47A, 47B is a specified value (set pressure) or more. As a result, the relief valves 53A, 53B prevent the traveling driving apparatus 31L from damaging by high pressure.

The drain port 54 opens to the motor casing 33 of the hydraulic motor 32L, for example. The drain port 54 discharges from the hydraulic motor 32L the oil (drain) leaking from a gap of a sliding portion of internal parts including a piston in the hydraulic motor 32L. The drain port 54 is connected to the hydraulic oil tank 15 through a drain pipeline 57.

Meanwhile, as shown in FIG. 2, the right traveling driving apparatus 31R rotatively drives the right drive wheel based on the pressurized oil supplied from the second hydraulic pump 14. The right traveling hydraulic motor 32R of the right traveling driving apparatus 31R is connected to the hydraulic pump 14 and the hydraulic oil tank 15 through the right supply/discharge lines 26A, 26B. The right traveling hydraulic motor 32R, as a second hydraulic motor (hereafter simply referred to as hydraulic motor 32R), is rotatively driven by the pressurized oil from the second hydraulic pump 14. The right traveling directional control valve 24 is provided on the way of the right supply/discharge lines 26A, 26B. The right traveling driving apparatus 31R functions in the same manner as the left traveling driving apparatus 31L. In the right traveling driving apparatus 31R (hereafter simply referred to as traveling driving apparatus 31R), the component elements that are identical to those of the foregoing left traveling driving apparatus 31L will be simply denoted by the same reference numerals to avoid repetitions of similar explanations.

In this case, the right traveling driving apparatus 31R is configured by the right traveling hydraulic motor 32R and the right brake valve 44R (hereafter simply referred to as brake valve 44R). The right counter balance valve 71R as a second counter balance valve (hereafter simply referred to as counter balance valve 71R) is located between the right traveling directional control valve 24 and the right traveling hydraulic motor 32R and provided on the way of a pair of supply/discharge lines 26A, 26B. The counter balance valve 71R allows the right spool 72R as a second spool (hereafter simply referred to as spool 72R) to be axially displaced based on a pressure difference between the supply/discharge lines 26A, 26B.

The drain pipeline 57 connects the drain port 54 of the traveling driving apparatuses 31L, 31R (hydraulic motors 32L, 32R) and the hydraulic oil tank 15. The drain pipeline 57 discharges to the hydraulic oil tank 15 the drain from the traveling driving apparatuses 31L, 31R including the hydraulic motors 32L, 32R. That is, the drain from the traveling driving apparatuses 31L, 31R recirculates to the hydraulic oil tank 15 through the drain pipeline 57.

The pilot pressure control valve 58 switches the tilting switching valve 51 of the traveling driving apparatuses 31L, 31R. For this reason, the pilot pressure control valve 58 controls the pressurized oil (pilot pressure) from the pilot hydraulic pump 20. That is, the pilot pressure control valve 58 controls the transmission pilot pressure supplied to the tilting switching valve 51 switching the motor tilting of the traveling driving apparatuses 31L, 31R (hydraulic motors 32L, 32R). The pilot pressure control valve 58 is, for example, a 3-port and 2-position electromagnetic switching valve (electromagnetic proportional control valve) composed of a proportional electromagnetic valve, having a solenoid operated pilot portion 58A (solenoid).

An input side of the pilot pressure control valve 58 is connected to the pilot hydraulic pump 20 through the pilot delivery line 21. An output side of the pilot pressure control valve 58 is connected to the tilting switching valve 51 (or the hydraulic pilot portion 51A) through the gear change pilot line 59 and the pilot pressure port 46 of the traveling driving apparatuses 31L, 31R. The solenoid operated pilot portion 58A of the pilot pressure control valve 58 is connected to the controller 61. The pilot pressure control valve 58 can output the pressurized oil (transmission pilot pressure) of the pressure corresponding to a power W supplied from the controller 61. Meanwhile, the pilot pressure control valve 58 communicates the pilot pressure port 46 with the hydraulic oil tank 15, as shown in FIG. 2, when the power W is not supplied from the controller 61.

The gear change pilot line 59 is provided between the pilot pressure control valve 58 and the tilting switching valve 51 of the traveling driving apparatuses 31L, 31R. That is, the gear change pilot line 59 is a line connecting the pilot pressure control valve 58 and the tilting switching valve 51. The gear change pilot line 59 supplies the pilot pressure from the pilot pressure control valve 58 to the tilting switching valve 51.

The tilting switch 60 as a capacity changing switch (speed changing switch) is installed in the cab 7. The tilting switch 60 is connected to the controller 61. The tilting switch 60 switches the motor capacity of the traveling driving apparatuses 31L, 31R (controls the tilting state of hydraulic motors 32L, 32R). That is, an operator can adjust the driving speed (rotational speed) of the traveling driving apparatuses 31L, 31R by operating the tilting switch 60.

In this case, the tilting switch 60 has 2 selection positions (in traveling mode), for example, a low-speed position (in low-speed mode) allowing the hydraulic excavator 1 (lower traveling structure 2) to travel at a low speed and a high-speed position (in high-speed mode) allowing the same at a high speed. The motor capacity is larger (larger tilting) and the hydraulic motors 32L, 32R can be rotated at a low speed when the tilting switch 60 is switched to the low-speed position. Meanwhile, the motor capacity is smaller (smaller tilting) and the hydraulic motors 32L, 32R can be rotated at a high speed when the tilting switch 60 is switched to the high-speed position.

The controller 61 is a control device controlling (electronically controlling) the pilot pressure control valve 58. The controller 61 is configured to include a microcomputer, a drive circuit, and a power circuit. That is, the controller 61 includes an arithmetic processing portion configured to include a memory such as RAM and ROM and CPU, and is operated according to a computer program. An input side of the controller 61 is connected to the tilting switch 60. An output side of the controller 61 is connected to the pilot pressure control valve 58. Furthermore, a battery (not shown) as a power source mounted on the upper revolving structure 4 supplies power to the controller 61.

The state of the tilting switch 60, or whether the traveling mode (selection position) is in the low-speed mode (at the low-speed position) or in the high-speed mode (at the high-speed position) is input to the controller 61. The controller 61 supplies a driving electric power W to the pilot pressure control valve 58 and controls the transmission pilot pressure acting on the pilot pressure port 46 of the traveling driving apparatuses 31L, 31R. For example, the controller 61 supplies the power W to the pilot pressure control valve 58 when it is judged that the tilting switch 60 is set at a high-speed position corresponding to a small motor tilting (at a high speed and low torque).

As described above, the controller 61 controls the pilot pressure control valve 58, depending on the selection position of the tilting switch 60. As a result, the controller 61 controls the motor capacity of the traveling driving apparatuses 31L, 31R (state of motor tilting). Specifically, the controller 61 supplies the power W to (the solenoid operated pilot portion 58A of) the pilot pressure control valve 58 such that the hydraulic motors 32L, 32R have a small capacity (at a high speed and low torque) when the tilting switch 60 is at the high-speed position. Meanwhile, the controller 61 supplies no power W to (the solenoid operated pilot portion 58A of) the pilot pressure control valve 58 when the tilting switch 60 is at the low-speed position. In this case, the hydraulic motors 32L, 32R have a large capacity (at a low speed and high torque).

Subsequently, counter balance valves 71L, 71R of the embodiment will be described. The left counter balance valve 71L will be mainly described as below, but a right counter balance valve 71R is configured in the same manner.

As shown in FIGS. 3 to 7, the counter balance valve 71L (71R) is configured by a 6-port and 5-position spring center type spool switching valve. In the counter balance valve 71L (71R), a spool 72L (72R) is held at a neutral position AO by neutral springs 103. A pair of pressure chambers 104, 105 of the counter balance valve 71L (71R) are connected to a pair of valve ports 45A, 45B through speed adjusting throttles 106. That is, one (left) pressure chamber 104 of the counter balance valve 71L (71R) is connected to one (left) valve port 45A through a speed adjusting throttle 106. The other (right) pressure chamber 105 of the counter balance valve 71L (71R) is connected to the other (right) valve port 45B through a speed adjusting throttle 106.

The pressure of the valve ports 45A, 45B acts on the pressure chambers 104, 105 of the counter balance valve 71L (71R). The spool 72L (72R) is displaced axially (or in the right-and-left direction) by thrust force based on a differential pressure between one pressure chamber 104 and the other pressure chamber 105 when a differential pressure (motor driving pressure) is generated between one valve port 45A and the other valve port 45B. The speed adjusting throttle 106 adjusts the traveling speed of the spool 72L (72R) to reduce shock at start and stop generated by extremely swift motion of the spool 72L (72R).

The counter balance valve 71L (71R) can be switched between a neutral position AO, a drive position AR1, a drive position AR2, a drive position AL1, and a drive position AL2 by the motion of the spool 72L (72R). The neutral position AO is set to shut off a section between a pair of (left and right) valve ports 45A, 45B and a pair (left and right) motor ports 47A, 47B. The drive position AR1 is set to communicate the motor port 47A and the valve port 45A through a notch portion 107 as a throttle passage, and shut off a section between the valve port 45B and the motor port 47B. The drive position AR2 is set to communicate the motor port 47A and the valve port 45A through an entire-circumferential opening portion 108 as an entire-circumferential oil passage, communicate the pressure chamber 105 and the valve port 45B through a quick returning oil passage 109, and shut off a section between the valve port 45B and the motor port 47B. Furthermore, in the embodiment, the valve port 45A and the valve port 45B are communicated through a communicating passage 73L (73R) and a throttle 74L (74R) at the drive position AR2, as described below.

The drive position AL1 is set to communicate the motor port 47B and the valve port 45B through a notch portion 107 as a throttle passage, and shut off a section between the valve port 45A and the motor port 47A. The drive position AL2 is set to communicate the motor port 47B and the valve port 45B through an entire-circumferential opening portion 108 as an entire-circumferential oil passage, communicate the pressure chamber 104 and the valve port 45A through a quick returning oil passage 109, and shut off a section between the valve port 45A and the motor port 47A. Moreover, in the embodiment, the valve port 45A and the valve port 45B are communicated through a communicating passage 73L (73R) and a throttle 74L (74R) at the drive position AL2 as described below. Pressurized oil is used to enhance the responsiveness of the spool 72L (72R) at the drive positions AR2, AL2 because the pressurized oil can travel in and out of the pressure chambers 104, 105 not through the speed adjusting throttles 106 while the quick returning oil passages 109 are open.

Figure 8:
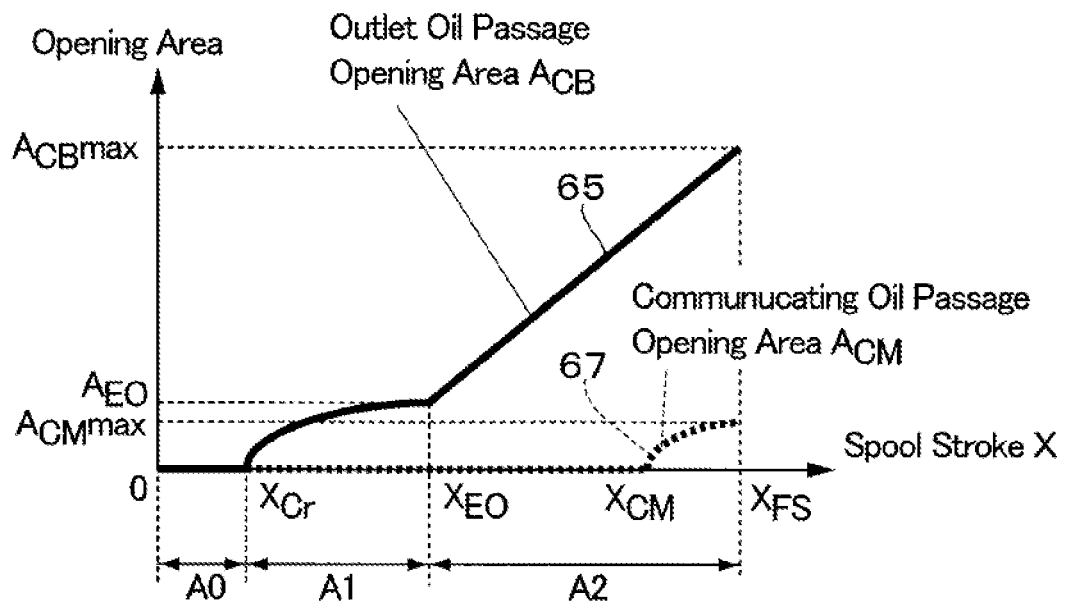
FIG. 8 is a characteristic diagram of one example of the relationship between the "spool stroke X" of the counter balance valve, and the "opening area $A_{CB}$ of outlet oil passage" or the "opening area $A_{CM}$ of communicating passage".

The property of an opening area of an outlet oil passage of such a counter balance valve 71L (71R) will be described by referring to FIG. 8. FIG. 8 shows the relationship between the stroke X of the spool 72L (72R) and the opening area $A_{CB}$ of the outlet oil passage of the counter balance valve 71L (71R) in solid line 65. The position where the stroke X of the spool 72L (72R) is 0 (X=0) corresponds to a neutral position AO. At this time, the opening area $A_{CB}$ of the outlet oil passage of the counter balance valve 71L (71R) is 0 ($A_{CB}$=0). The section $X_{Cr} \leq X \leq X_{EO}$ of the stroke X of the spool 72L (72R) corresponds to a drive position AR1 or a drive position AL1'. At this time, the opening area $A_{CB}$ of the outlet oil passage gradually increases to $A_{EO}$ by conforming to an opening of the notch portion 107. The section $X_{EO} \leq X \leq X_{FS}$ of the stroke X of the spool 72L (72R) corresponds to a drive position AR2 or a drive position AL2. At this time, the opening area $A_{CB}$ of the outlet oil passage increases to the maximum opening area $A_{CB}$ max in proportion with the stroke X by conforming to an opening of the entire-circumferential opening portion 108. $X_{FS}$ corresponds to the maximum stroke position $X_{FS}$ of the spool 72L (72R).

Figure 9:
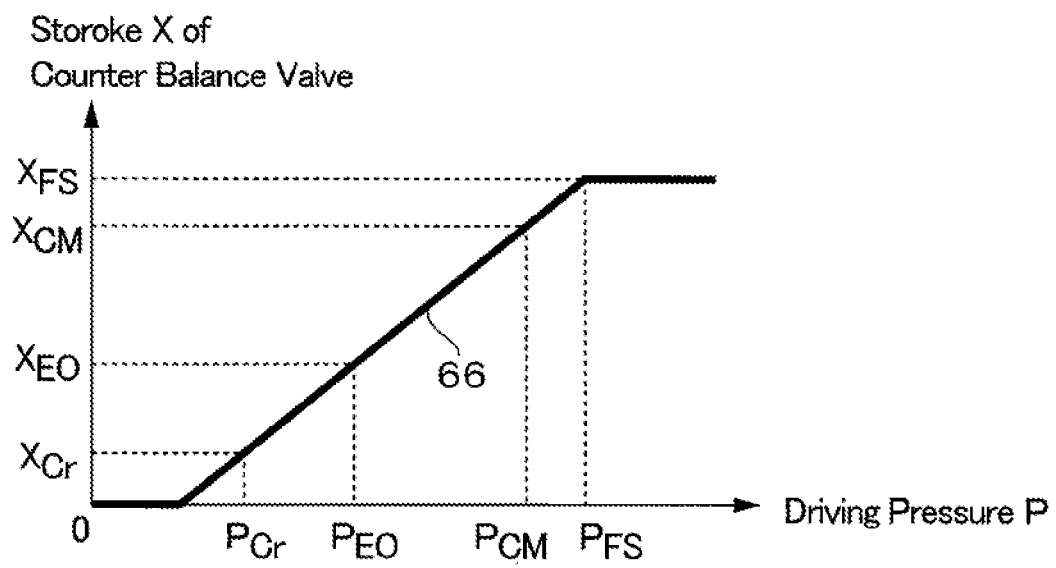
FIG. 9 is a characteristic diagram of one example of the relationship between the "driving pressure P" and the "spool stroke X" of the counter balance valve.

The operational property of the counter balance valve 71L (71R) will be described by referring to FIG. 9. FIG. 9 shows the relationship between the driving pressure P of the counter balance valve 71L (71R) and the stroke X in solid line 66. The stroke X of the spool 72L (72R) is in proportional with the driving pressure P, and comes to $X_{Cr}$ and $X_{EO}$ positions when the driving pressure P is $P_{Cr}$ and $P_{EO}$, respectively. The spool 72L (72R) is held at the maximum stroke position $X_{FS}$ when the driving pressure P is $P_{FS}$ or more ($P \geq P_{FS}$).

Figure 15:
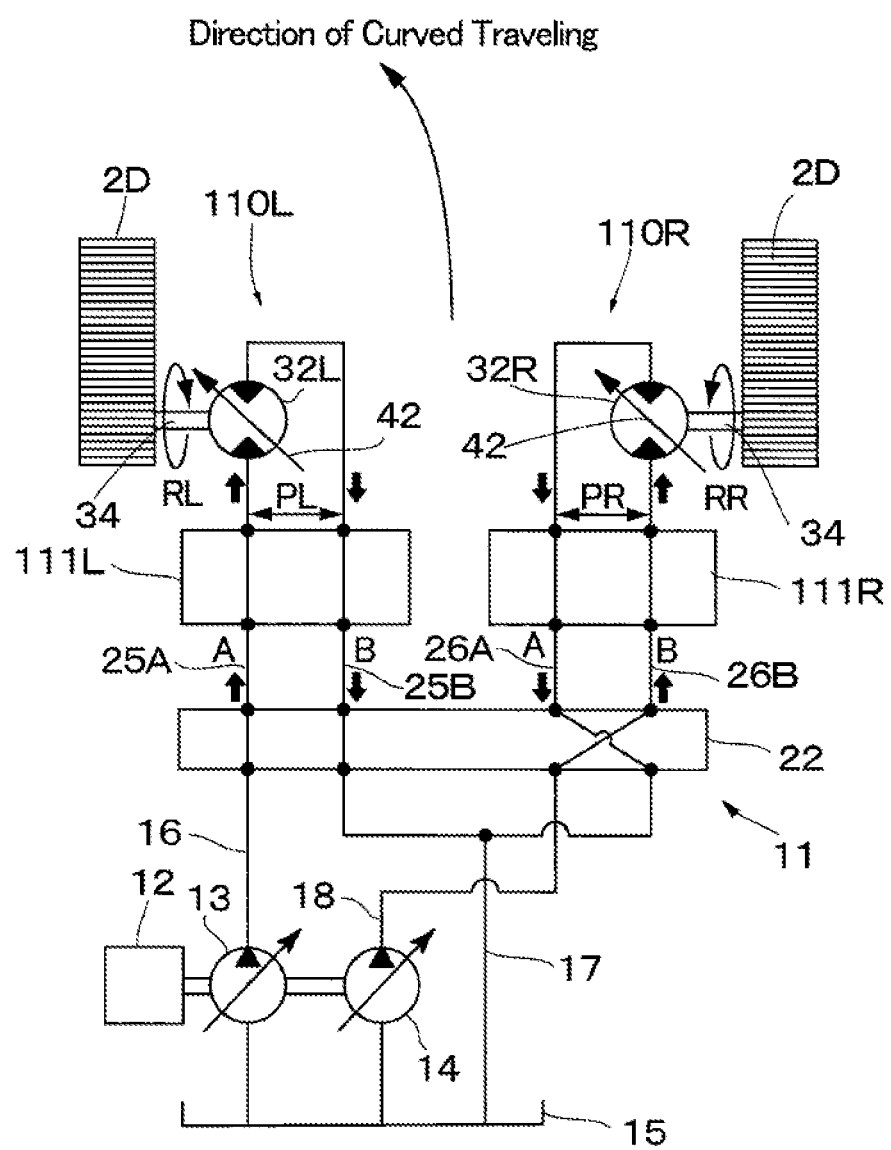
FIG. 15 is a conceptual diagram of an operation of mistracking according to a Comparative Example.

Subsequently, the mistraking of the hydraulic excavator 1 will be described using FIGS. 15 and 16. FIG. 15 is a conceptual diagram of mistracking by a hydraulic excavator (in Comparative Example) with a counter balance valve where a communicating passage 73L (73R) and a throttle 74L (74R), which are as characteristics of the embodiment, are not provided. Herein, the rotational speed of the left traveling driving apparatus 110L in FIG. 15 is denoted as RL, while the rotational speed of the right traveling driving apparatus 110R is denoted as RR. The driving pressure of the left traveling driving apparatus 110L is denoted as PL, while the driving pressure of the right traveling driving apparatus 110R is denoted as PR.

The right crawler belt 2D rotates faster than the left crawler belt 2D, for example, when the rotational speed RR of the right traveling driving apparatus 110R is higher than the rotational speed RL of the left traveling driving apparatus 110L (RR>RL) while traveling on the level ground. As a result, the high rotation right traveling driving apparatus 110R drags the low rotation left traveling driving apparatus 110L, which shows the relationship of PR>PL in the driving pressures PL, PR of the left and right traveling driving apparatuses 110L, 110R. The driving pressures PL, PR affect the opening property of the counter balance valves installed in the brake valves 111L, 111R. A lower driving pressure PL throttles an oil passage on a motor side of the counter balance valve (output side) to further decelerate the left traveling driving apparatus 110L on a low rotation side. As a result, the hydraulic excavator 1 tends to significantly mistrack leftward.

Figure 16:
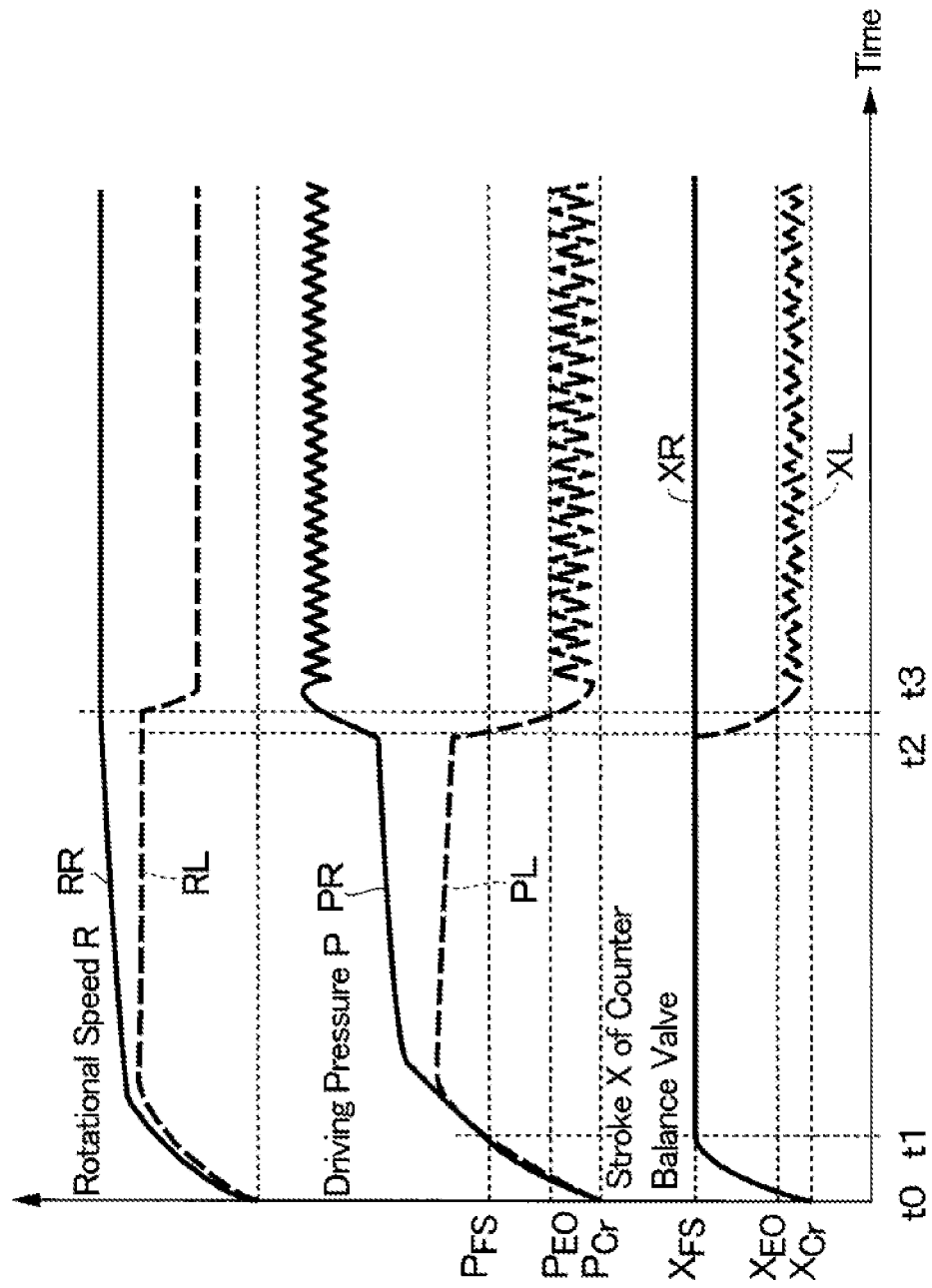
FIG. 16 is a characteristic diagram of one example of the time variations in the "rotational speed R", the "driving pressure P", and the "stroke X" according to the Comparative Example.

FIG. 16 is a characteristic diagram showing one example of time variations in rotational speeds RL, RR, driving pressures PL, PR, and stroke XL, XR according to a Comparative Example. In this case, the stroke of a spool of the counter balance valve of the left traveling driving apparatus 110L is denoted as XL, while the stroke of a spool of the counter balance valve of the right traveling driving apparatus 110R is denoted as XR.

The driving pressures PL, PR of the left and right traveling driving apparatuses 110L, 110R exceed $P_{FS}$ at the time of t1, and the strokes XL, XR reach the maximum stroke $X_{FS}$. Since a difference in rotational speed between the left and right traveling driving apparatuses 110L, 110R allows the high rotation right traveling driving apparatus 110R to drag the low rotation left traveling driving apparatus 110L, the right traveling driving apparatus 110R is under high pressure on the dragging side and the low rotation left traveling driving apparatus 110L is under low pressure on the dragged side, thereby generating a difference between the left and right driving pressures PL, PR. Herein, the resulting rising oil temperatures by friction further widen a difference between the delivery flow amount $Q_P1$ of the first hydraulic pump 13 and the delivery flow amount $Q_P2$ of the second hydraulic pump 14.

The traveling load variations or the like at the time of t2 lose balance between the "dragging state" and the "dragged state", thereby sharply increasing the driving pressure PR and reducing the driving pressure PL. In this case, the driving pressure PL of the left traveling driving apparatus 110L is lower than $P_{FS}$, allowing the stroke XL to start decreasing. The driving pressure PL of the left traveling driving apparatus 110L is lower than $P_{EO}$ and the stroke XL decreases to $X_{EO}$ at the time of t3. Thus, the opening area $A_{CB}$ of an outlet oil passage of the left counter balance valve sharply declines, allowing a brake to be applied on the left traveling driving apparatus 110L and the rotational speed RL of the left traveling driving apparatus 110L to sharply decelerate. As a result, a difference in rotational speed between the left and right traveling driving apparatuses 110L, 110R further widens, which allows the vehicle to significantly mistrack leftward. Once a significant mistraking starts to occur, a driving pressure P high enough to achieve the stroke X of the counter balance valve larger than $X_{EO}$ (X>$X_{EO}$), or a driving pressure larger than $P_{EO}$ (P>$P_{EO}$) cannot be achieved. As a result, significantly mistacking can last for a long period of time.

On the other hand, in the embodiment, the communicating passages 73L, 73R are provided on the spools 72L, 72R of the left and right counter balance valves 71L, 71R, respectively. That is, in the embodiment, the motor port 47A and the valve port 45A are communicated through the entire-circumferential opening portion 108 as an entire-circumferential oil passage, and the pressure chamber 105 and the valve port 45B are communicated through the quick returning oil passage 109 at the drive position AR2. Also, a section between the valve port 45B and the motor port 47B is shut off, and the valve port 45A and the valve port 45B are communicated through the communicating passage 73L (73R) and the throttle 74L (74R). The motor port 47B and the valve port 45B are communicated through the entire-circumferential opening portion 108 as an entire-circumferential oil passage, and the pressure chamber 104 and the valve port 45A are communicated through the quick returning oil passage 109 at the drive position AL2. Also, a section between the valve port 45A and the motor port 47A is shut off, and the valve port 45A and the valve port 45B are communicated through the communicating passage 73L (73R) and the throttle 74L (74R).

The broken line 67 in FIG. 8 indicates a communicating oil passage opening area $A_{CM}$ as an opening area of the communicating passages 73L, 73R. The communicating passages 73L, 73R have a property of opening when the stroke X is $X_{CM}$ or more (X≥$X_{CM}$) and indicating the maximum opening $A_{CM}$ max when the stroke X is $X_{FS}$ at the drive position AR2 or the drive position AL2 of the spools 72L, 72R. In this case, the stroke $X_{CM}$ allowing the communicating passages 73L, 73R to open is set as a position where the stroke $X_{CM}$ is between a stroke $X_{EO}$ position prior to the start of communication of the entire-circumferential opening portion 108 and a full stroke $X_{FS}$ position, or a position where the stroke $X_{CM}$ is larger than the stroke $X_{EO}$ and smaller than the full stroke $X_{FS}$ ($X_{EO}$<$X_{CM}$<$X_{FS}$). As shown in FIG. 9, the stroke $X_{CM}$ corresponds to the driving pressure $P_{CM}$. In this case, the driving pressure $P_{CM}$ is larger than the driving pressure $P_{EO}$ corresponding to the stroke $X_{EO}$ position and smaller than driving pressure $P_{FS}$ corresponding to the full stroke $X_{FS}$ position ($P_{EO}$<$P_{CM}$<$P_{FS}$).

Figure 10:
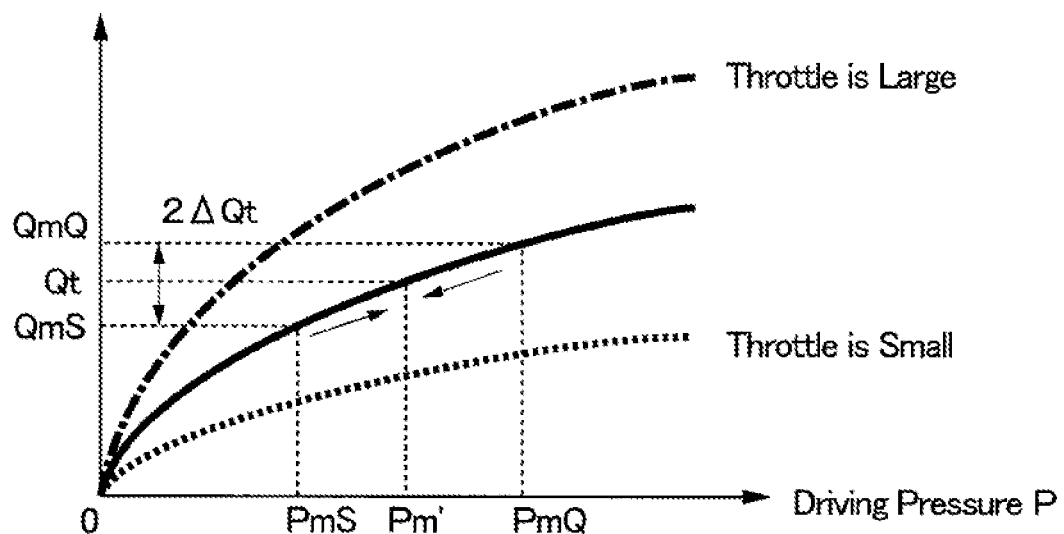
FIG. 10 is a characteristic diagram of one example of the relationship between the "driving pressure P" and the "communication flow amount Q".

FIG. 10 shows the property of a communicating oil passage throttle, or the property of the throttles 74L, 74R of the communicating passages 73L, 73R (throttle property). Herein, throttle properties can generally be expressed by the following Formulas 2 and 3, where throttle passing flow amount is Q, throttle diameter is d, operating pressure is P, and oil liquid viscosity is p. Formula 2 corresponds to a property of orifice throttle, and Formula 3 corresponds to a property of choke throttle.

$Q(d,P)=Kd^2\sqrt{P}$ (K: proportionality coefficient) [Formula 2]

$q(d,\mu,P)=Kd^4/\mu \cdot P$ (K: proportionality coefficient) [Formula 3]

In the embodiment, the throttle property of the communicating passages 73L, 73R (communicating oil passage throttle property) is an in-between property of the orifice throttle and choke throttle. As shown in FIG. 10, the flow amount increases as a throttle diameter d widens or an oil temperature rises and a viscosity p declines.

Herein, a larger communicating oil passage throttle results in a higher effect of suppressing mistracking, but the resulting larger communicating oil amount at a high driving pressure reduces the volume efficiency of the traveling driving apparatuses 31L, 31R and the speed during slope climbing and steering. Then, a minimum throttle capable of maintaining a sufficient effect of suppressing mistracking must be selected. Such a throttle can be selected as follows. That is, the rotational speed R of the traveling driving apparatus 31L (31R) is determined by the above Formula 1, using the delivery flow amount Qp of the hydraulic pumps 13, 14 and the capacity Vm of the hydraulic motor 32L (32R).

The rotational speed R can be expressed by the following Formula 4 and is the maximum rotational speed RQ when the delivery flow amount Qp is a specification value or the maximum successful mass production value Qp max, and the volume Vm is a specification value or the minimum successful mass production value Vm min.

$$RQ = K \cdot \frac{Qp\max}{Vm\min} \quad \text{[Formula 4]}$$

The rotational speed R can be expressed by the following Formula 5 and is the minimum rotational speed RS when the delivery flow amount $Q_P$ is a specification value or the minimum successful mass production value Qp min, and the volume Vm is a specification value or the maximum successful mass production value Vm max.

$$RS = K \cdot \frac{Qp\min}{Vm\max} \quad \text{[Formula 5]}$$

A difference in rotational speed between the maximum rotational speed RQ and the minimum rotational speed RS is the maximum difference in rotational speed that can be generated in a mass-produced vehicle body. In order to eliminate such a difference in rotational speed, it is thought that the supply flow amount of the traveling driving apparatus 31L (31R) of the maximum rotational speed RQ' is reduced by ΔQt, and the supply flow amount of the traveling driving apparatus 31R (31L) of the minimum rotational speed RS' is increased by ΔQt. By defining the rotational speed R with a ΔQt increase and decrease as RQ' and RS', respectively, the RQ' and RS' values can be expressed by the following Formulas 6 and 7.

$$RQ' = K \cdot \frac{(Qp\max - \Delta Qt)}{Vm\min} \quad \text{[Formula 6]}$$

$$RS' = K \cdot \frac{(Qp\min + \Delta Qt)}{Vm\max} \quad \text{[Formula 7]}$$

To eliminate such a difference in rotational speed, ΔQt that satisfies RQ'=RS' may be determined. That is, the ΔQt can be expressed by the following Formula 8.

$$\Delta Qt = \frac{(Vm\max Qp\max - Vm\min Qp\min)}{(Vm\max + Vm\min)} \quad \text{[Formula 8]}$$

Therefore, in order to eliminate the maximum difference in rotational speed generated in a mass-produced vehicle body, flow amount correction by 2ΔQt may be performed between the traveling driving apparatus 31L (31R) on a high speed side and the traveling driving apparatus 31R (31L) on a low speed side.

The driving pressure PmQ of the hydraulic motor 32L (32R) on a high speed side and the driving pressure PmS of the hydraulic motor 32R (32L) on a low speed side while traveling on the level ground are measured when the delivery flow amount Qp of the hydraulic pumps 13, 14 and the volume Vm of the hydraulic motors 32L, 32R on a construction machine such as a hydraulic excavator 1 (working vehicle) are adjusted to the maximum differences in rotational speed RQ, RS generated in a mass-produced vehicle body. The throttle diameter d is set such that the throttle passing flow amounts QmQ, QmS are expressed as the relationship in Formula 9 when the driving pressure PmQ and the driving pressure PmS act on the vehicle.

$$QmQ - QmS = 2\Delta Qt = 2 \times \frac{(Vm\max Qp\max - Vm\min Qp\min)}{(Vm\max + Vm\min)} \quad \text{[Formula 9]}$$

Figure 5:
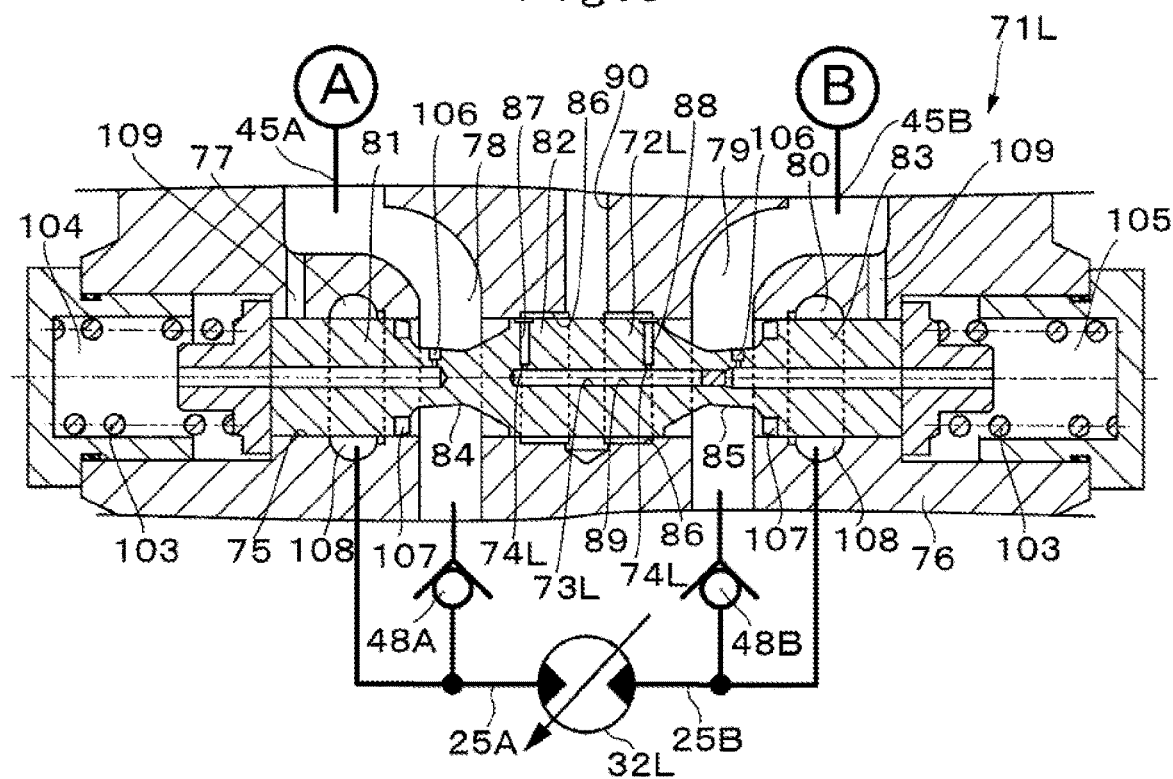
FIG. 5 is a longitudinal sectional view of a counter balance valve according to the embodiment shown when a spool stroke is at the O position (neutral position) in FIG. 8.

FIG. 5 shows the left counter balance valve 71L of the embodiment at a neutral position (0 position). The communicating passage 73L as a communicating oil passage is provided in the spool 72L of the counter balance valve 71L. That is, the communicating passage 73L extending axially is formed inside of the spool 72L. Throttles 74L composed of 2 throttles are installed at the communicating passage 73L. A communicating oil passage between a pair of (left, right) valve ports 45A, 45B and a pair of (left, right) motor ports 47A, 47B is shut off when the spool 72L is at the neutral position AO (stroke X=0).

Figure 6:
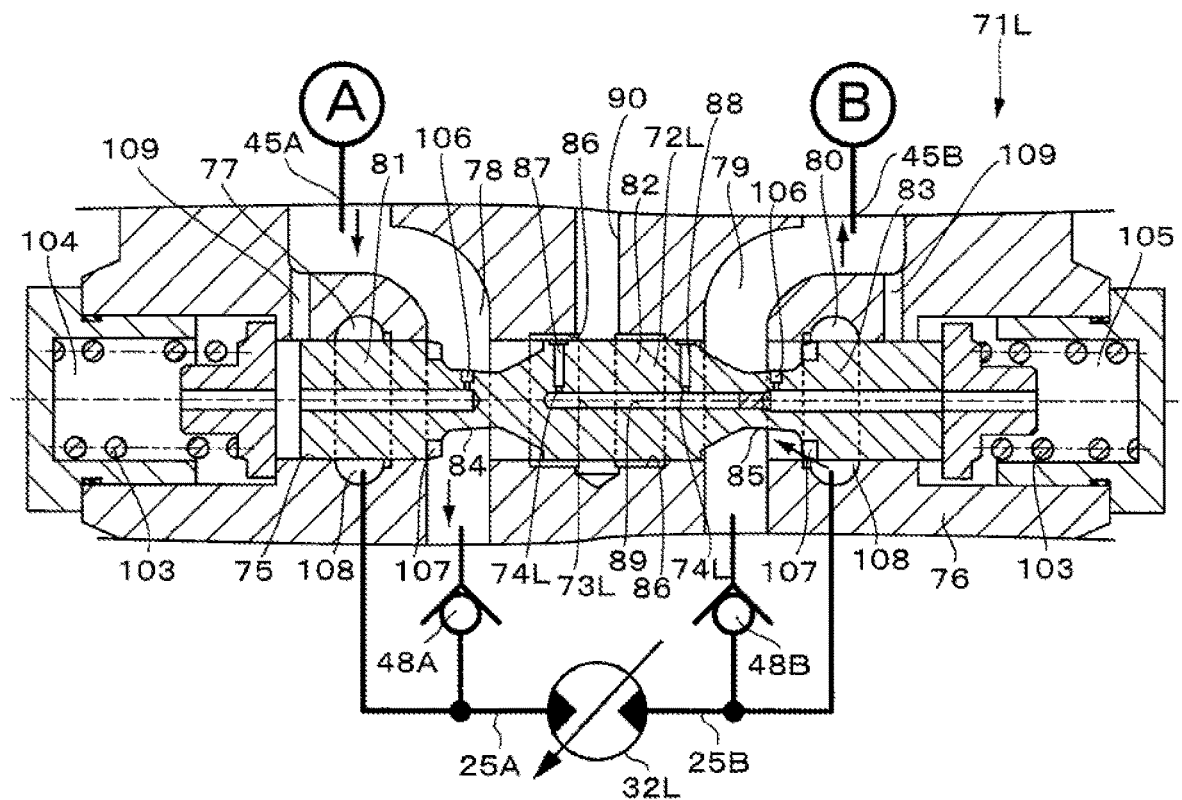
FIG. 6 is a longitudinal sectional view of the counter balance valve shown when the spool stroke is at the $X_{EO}$ position (notch final position, position directly before start in entire-circumferential oil passage) in FIG. 8.

FIG. 6 shows the counter balance valve 71L of the embodiment at a stroke $X_{EO}$ position just before the start of communication of the entire-circumferential opening portion 108. An oil passage between the motor port 47B and the valve port 45B is communicated through the notch portion 107 as a throttle passage at the $X_{EO}$ position (stroke $X=X_{EO}$), in other words, between the drive position AL1 and the drive position AL2. Meanwhile, an oil passage between the valve port 45A and the motor port 47A, and the communicating passage 73L between a pair (left, right) of valve ports 45A, 45B are shut off.

Figure 7:
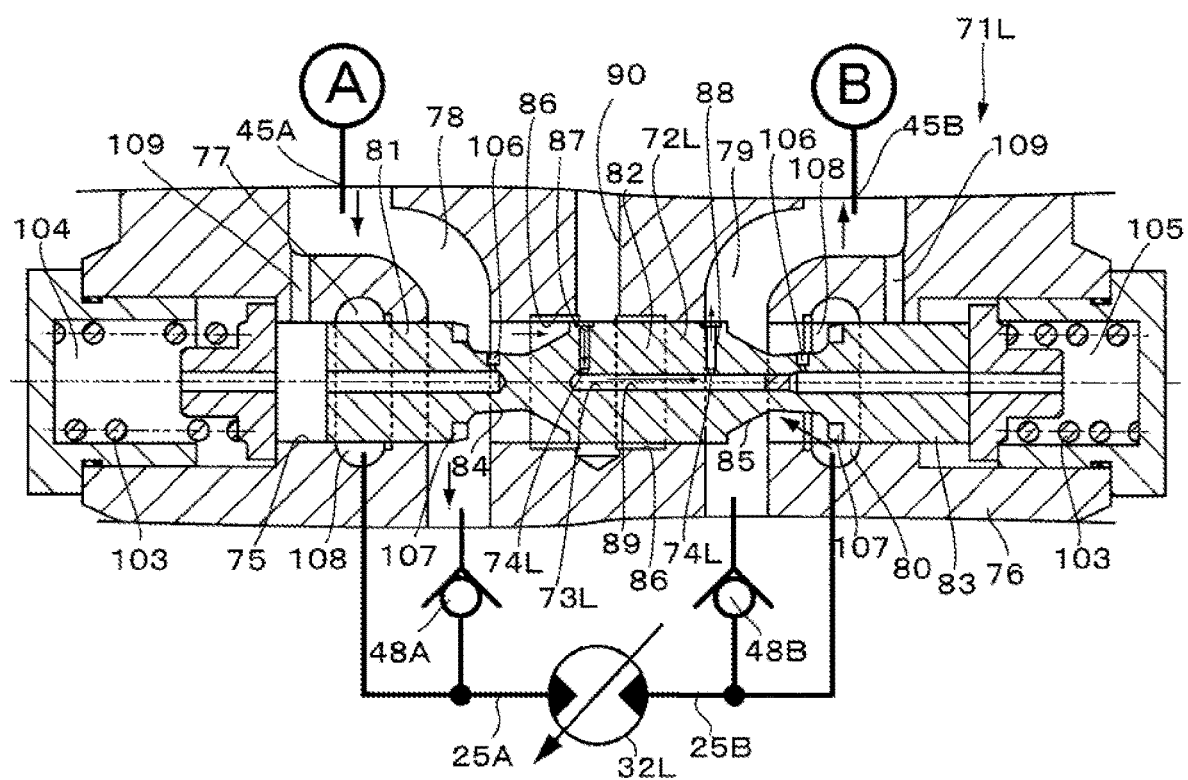
FIG. 7 is a longitudinal sectional view of the counter balance valve shown when the spool stroke is at the $X_{FS}$ position (full stroke position) in FIG. 8.

FIG. 7 shows the counter balance valve 71L of the embodiment at the maximum stroke position $X_{FS}$. An oil passage between the motor port 47B and the valve port 45B is communicated through the entire-circumferential opening portion 108 as an entire-circumferential oil passage at the $X_{FS}$ position (stroke $X=X_{FS}$), in other words, at the drive position AL2. Meanwhile, an oil passage between the valve port 45A and the motor port 47A is shut off, and a pair (left, right) of valve ports 45A, 45B is communicated through the communicating passage 73L and the throttle 74L. As described above, in the counter balance valve 71L of the embodiment, pressurized oil having the flow amount Qt travels between the pair (left, right) of valve ports 45A, 45B through the communicating passage 73L and the throttle 74L, depending on the driving pressure P at the drive position AR2 and the drive position AL2.

As described above, according to the embodiment, the left counter balance valve 71L includes a communicating passage 73L as a first communicating passage communicating the first and second left supply/discharge lines 25A, 25B when the displacement of the left spool 72L exceeds a predetermined amount ($X_{CM}$) by a pressure difference between the first and second left supply/discharge lines 25A, 25B (or between the pair of valve ports 45A, 45B). In this case, the communicating passage 73L is provided in the left spool 72L of the left counter balance valve 71L.

Likewise, as shown in FIG. 2, the right counter balance valve 71R includes a communicating passage 73R as a second communicating passage communicating the first and second right supply/discharge lines 26A, 26B when the displacement of the right spool 72R exceeds a predetermined amount ($X_{CM}$) by a pressure difference between the first and second right supply/discharge lines 26A, 26B. In this case, the communicating passage 73R is provided in the right spool 72R of the right counter balance valve 71R.

The predetermined amount ($X_{CM}$), or the displacement (stroke) of the spool 72L (72R) where the communicating passage 73L (73R) communicates the supply/discharge lines 25A, 25B (26A, 26B) is set between the $X_{EO}$ position at which communication of the entire-circumferential opening portion 108 is started and the $X_{FS}$ position as the maximum stroke position. That is, the predetermined amount ($X_{CM}$) is set at a position beyond the notch portion 107 as a throttle passage. More specifically, the supply/discharge lines 25A, 25B (26A, 26B) are communicated by the communicating passage 73L (73R) when the spool 72L (72R) is displaced from the "neutral position (0)" more than the "$X_{CM}$ position closer to the $X_{FS}$ position than an intermediate position between the $X_{EO}$ position and the $X_{FS}$ position". In other words, the supply/discharge lines 25A, 25B (26A, 26B) are communicated by the communicating passage 73L (73R) at the maximum stroke position $X_{FS}$, but the supply/discharge lines 25A, 25B (26A, 26B) are not communicated by the communicating passage 73L (73R) between the neutral position (0) and the $X_{CM}$ position.

The first throttle 74L limiting the flow amount of the pressurized oil circulating in the communicating passage 73L is provided on the way of the communicating passage 73L. Likewise, as shown as FIG. 2, the second throttle 74R limiting the flow amount of the pressurized oil circulating in the communicating passage 73R is provided on the way of the communicating passage 73R. The first throttle 74L and the second throttle 74R are set such that a difference between the "flow amount of the pressurized oil traveling between the first hydraulic pump 13 and the left traveling hydraulic motor 32L" and the "flow amount of the pressurized oil traveling between the second hydraulic pump 14 and the right traveling hydraulic motor 32R" is limited while both the left traveling hydraulic motor 32L and the right traveling hydraulic motor 32R are in rotation. That is, the first throttle 74L and the second throttle 74R are set to have a communication flow amount such that the "flow amount of the pressurized oil traveling from the first hydraulic pump 13 to the left traveling hydraulic motor 32L" and the "flow amount of the pressurized oil traveling from the second hydraulic pump 14 to the right traveling hydraulic motor 32R" is reduced while both the left traveling hydraulic motor 32L and the right traveling hydraulic motor 32R are in rotation.

Herein, as shown in FIGS. 5 to 7, the left counter balance valve 71L includes a housing 76, a plurality of (4) oil passages 77, 78, 79, 80, and the spool 72L. The housing 76 includes a spool sliding bore 75. The plurality of oil passages 77, 78, 79, 80 are provided to be separated from each other in an axial direction of the spool sliding bore 75. The spool 72L is movably inserted to the spool sliding bore 75 of the housing 76. The spool 72L is provided such that large diameter portions 81, 82, 83 (land) and small diameter portions 84, 85 (constriction) communicating or shutting off each of the oil passages 77, 78, 79, 80 are axially adjacent to each other.

The communicating passage 73L is provided at the large diameter portion 82 at an intermediate position in the 3 large diameter portions 81, 82, 83 of the spool 72L, or the large diameter portion 82 between the first small diameter portion 84 and the second small diameter portion 85. A communicating large diameter portion 86 having a larger inner diameter dimension than other portions is provided at a position radially opposite to the large diameter portion 82 at an intermediate position in an inner peripheral surface of the spool sliding bore 75. The communicating passage 73L includes a first radial passage 87, a second radial passage 88, and an axial passage 89. The first radial passage 87 opens toward the first left supply/discharge line 25A in an outer peripheral surface of the large diameter portion 82, and extends toward an inner diameter side from an outer peripheral surface of the large diameter portion 82. The first radial passage 87 communicates with the first left supply/discharge line 25A when the spool 72L is displaced by the predetermined amount ($X_{CM}$) from the neutral position toward the first left supply/discharge line 25A side.

The second radial passage 88 opens toward the second left supply/discharge line 25B in an outer peripheral surface of the large diameter portion 82, and extends toward an inner diameter side from an outer peripheral surface of the large diameter portion 82. The second radial passage 88 communicates with the second left supply/discharge line 25B when the spool 72L is displaced by the predetermined amount ($X_{CM}$) from the neutral position toward the second left supply/discharge line 25B side. The axial passage 89 axially extends along the center axis of the spool 72L. The axial passage 89 connects the first radial passage 87 and the second radial passage 88. The first radial passage 87 of the communicating passage 73L is provided with a first throttle 74L, having a smaller inner diameter dimension than other portions, located at a connecting portion with the axial passage 89. Also, the second radial passage 88 of the communicating passage 73L is provided with a first throttle 74L, having a smaller inner diameter dimension than other portions, located at a connecting portion of the axial passage 89. That is, in the embodiment, the communicating passage 73L is provided with a pair of first throttles 74L.

As shown in FIG. 7, the first left supply/discharge line 25A and the second left supply/discharge line 25B are connected (communicated) through a section between the inner peripheral surface of the spool sliding bore 75 and the outer peripheral surface of the first small diameter portion 84, a section between the communicating large diameter portion 86 of the spool sliding bore 75 and the outer peripheral surface of the first small diameter portion 84, and the communicating passage 73L when the stroke X of the spool 72L is larger than the predetermined amount ($X_{CM}$). Moreover, a brake oil passage 90 is provided at a portion opposite to the large diameter portion 82 at an intermediate position of the spool 72L in the housing 76. The brake oil passage 90 is connected to an oil chamber (not shown) of a parking brake device of the traveling driving apparatus 31L. Braking of a parking brake device (brake) is released when pressurized oil (parking brake release pressure) is supplied to an oil chamber (cylinder) of the parking brake device through the brake oil passage 90. The configuration of the right counter balance valve 71R is the same as the left counter balance valve 71L, and the description is thus omitted.

The hydraulic excavator 1 of this embodiment is configured as described, and subsequently, the operation of the hydraulic excavator 1 will be described.

An operator seated in the cab 7 starts the engine 12, which allows the hydraulic pumps 13, 14, 20 to be driven. As a result, the pressurized oil discharged from the hydraulic pumps 13, 14 is discharged toward the traveling hydraulic motors 32L, 32R, a revolving hydraulic motor, and the boom cylinder 5D, the arm cylinder 5E, and the bucket cylinder 5F of the working device 5, depending on the traveling operating devices 28, 29 provided in the cab 7, a lever operation and a pedal operation of the working lever operating device. As a result, the hydraulic excavator 1 can perform traveling operation by the lower traveling structure 2, revolving operation by the upper revolving structure 4, excavating operation by the working device 5, and the like.

Figure 11:
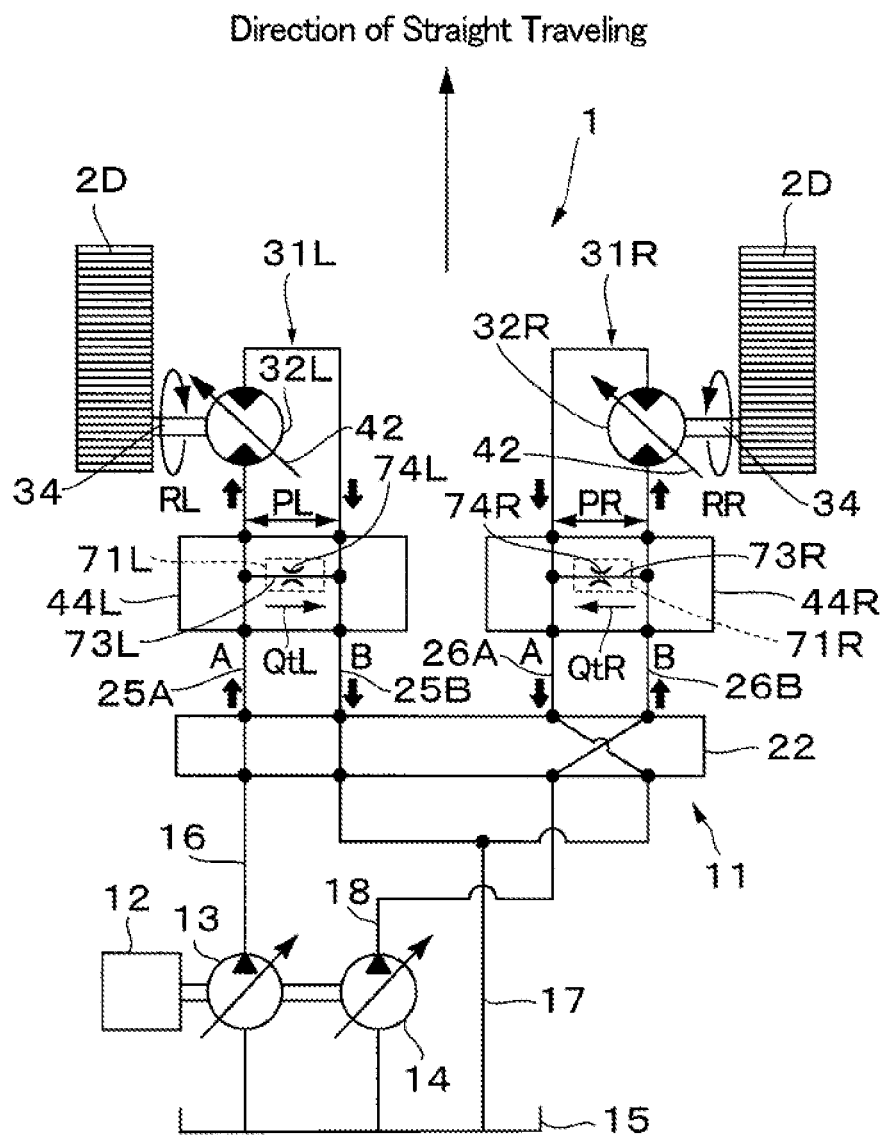
FIG. 11 is a conceptual diagram of an operation of suppressing mistracking according to the embodiment.

Herein, FIG. 11 is a conceptual diagram of an operation of suppressing mistracking of a working vehicle (hydraulic excavator 1) according to the embodiment. The operation of suppressing the above traveling will be described in association with the conceptual diagram of an operation of mistracking according to the Comparative Example in the above FIG. 15.

The right traveling driving apparatus 31R in high rotation drags the left traveling driving apparatus 31L in low rotation, showing the relationship of PR>PL of the driving pressures PL, PR of the left and right traveling driving apparatuses 31L, 31R when the rotational speed RR of the right traveling driving apparatus 31R is larger than the rotational speed RL of the left traveling driving apparatus 31L (RR>RL) while traveling on the level ground. At this time, the flow amounts QtL, QtR passing (the throttles 74L, 74R of) the communicating passages 73L, 73R in the brake valves 44L, 44R of the left and right traveling driving apparatuses 31L, 31R show the relationship of QtR>QtL. That is, the right traveling driving apparatus 31R in high rotation provides a smaller supply flow amount of the right traveling hydraulic motor 32R by (QtR−QtL) than the left traveling driving apparatus 31L in low rotation. As a result, a difference in rotational speed (RR−RL) varies to be smaller to suppress mistracking of the hydraulic excavator 1.

Figure 12:
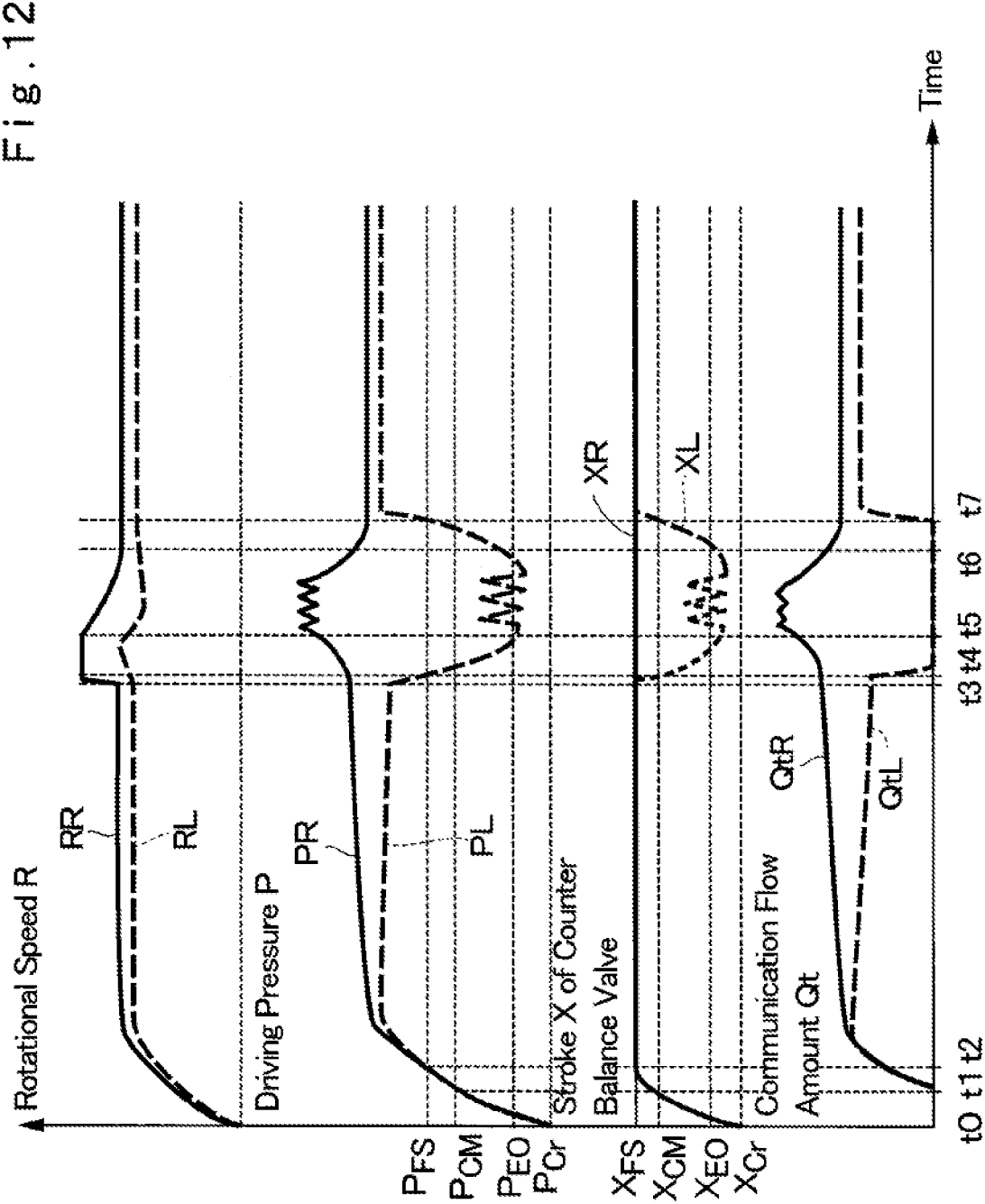
FIG. 12 is a characteristic diagram of one example of the time variations in the "rotational speed R", the "driving pressure P", the "stroke X" and the "communication flow amount Qt" according to the embodiment.

FIG. 12 is a characteristic diagram showing one example of time variations in rotational speeds RL, RR, driving pressures PL, PR, strokes XL, XR, and communication flow amounts QtL, QtR according to the embodiment. The characteristic diagram will be described in association with the above-described characteristic diagram in FIG. 16. The hydraulic excavator 1 starts at the time of t0. The rotational speeds RL, RR and the driving pressures PL, PR increase according to the start. At the time of t1, the driving pressures PL, PR of the left and right traveling driving apparatuses 31L, 31R exceed $P_{CM}$, and the strokes XL, XR of the counter balance valves 71L, 71R are at an opening stroke position of the communicating passages 73L, 73R, or correspond to the communicating oil passage opening stroke $X_{CM}$. As a result, the communicating passages 73L, 73R of the spools 72L, 72R open, and in the left and right traveling driving apparatuses 31L, 31R, pressurized oil communication starts between the valve ports 45A, 45B having the flow amounts QtL, QtR, respectively.

At the time of t2, the driving pressures PL, PR of the left and right traveling driving apparatuses 31L, 31R exceed $P_{FS}$, and the strokes XL, XR of the counter balance valves 71L, 71R correspond to the maximum stroke $X_{FS}$. Since a difference in rotational speed between the left and right traveling driving apparatuses 31L, 31R allows the high rotation right traveling driving apparatus 31R to drag the low rotation left traveling driving apparatus 31L, the right traveling driving apparatus 31R is under high pressure on the dragging side and the low rotation left traveling driving apparatus 31L is under low pressure on the dragged side, thereby generating a difference between the left and right driving pressures PL, PR.

Herein, as described above, the flow amounts QtL, QtR passing through the communicating passages 73L, 73R (throttles 74L, 74R) in the brake valves 44L, 44R vary and a difference in rotational speed (RR−RL) is smaller in operation, depending on the driving pressures PL, PR. Thus, a large difference in rotational speed is not generated unlike in the Comparative Example to achieve a smaller difference in rotational speed. As a result, the effects of "dragging state" and "dragged state" by the left and right traveling driving apparatuses 31L, 31R are smaller, and a difference in the driving pressures PL, PR is smaller than the Comparative Example.

Also, even if a difference between the delivery flow amount $Q_P1$ of the first hydraulic pump 13 and the delivery flow amount $Q_P2$ of the second hydraulic pump 14 further widens, a difference in flow amount passing through the communicating passages 73L, 73R (throttles 74L, 74R), in response to a widening difference between the driving pressures PL, PR, widens to make a straight traveling correction. Thus, the rotational difference between the left and right traveling driving apparatuses 31L, 31R doesn't widen.

At the time of t3, sudden flux variations, traveling load variations or the like of the first hydraulic pump 13 lose balance between the "dragging state" and the "dragged state", thereby sharply increasing the driving pressure PR and reducing the driving pressure PL. In this case, the driving pressure PL of the left traveling driving apparatus 31L is lower than $P_{FS}$ to allow the stroke XL of the left counter balance valve 71L to start decreasing.

At the time of t4, the driving pressure PL of the left traveling driving apparatus 31L is lower than $P_{CM}$ to allow the stroke XL of the left counter balance valve 71L to decrease to $X_{CM}$. Thus, the communicating passage 73L in the left spool 72L is shut off, and the pressurized oil communication amount passing between the valve ports 45A, 45B of the left traveling driving apparatus 31L, or the flow amount QtL is 0 (QtL=0). As a result, the pressurized oil which has not entered the left traveling hydraulic motor 32L by the communication of the valve ports 45A, 45B is supplied to the left traveling hydraulic motor 32L to allow the rotational speed RL of the left traveling driving apparatus 31L to increase. The resulting larger difference between the flow amounts QtL, QtR passing through the communicating passages 73L, 73R (throttles 74L, 74R) in the left and right brake valves 44L, 44R further increases the straight traveling correction operation.

Despite the above effect of making a straight traveling correction, the driving pressure PL of the left traveling driving apparatus 31L is lower than $P_{EO}$ at the time of t5. In this case, since the stroke XL of the left counter balance valve 71L decreases to $X_{EO}$, the opening area $A_{CB}$ of an outlet oil passage of the left counter balance valve 71L sharply decreases, and the left traveling driving apparatus 31L is thus braked to decrease the rotational speed RL of the left traveling driving apparatus 31L. Meanwhile, the right traveling driving apparatus 31R drags the decelerated left traveling driving apparatus 31L to further increase the driving pressure PR. Thus, the flow amount QtR passing through the communicating passage 73R (throttle 74R) in the brake valve 44R of the right traveling driving apparatus 31R further increases, and the resulting larger difference between the flow amounts QtL, QtR passing through the communicating passages 73L, 73R (throttles 74L, 74R) in the brake valves 44L, 44R of the left and right traveling driving apparatuses 31L, 31R allow the straight traveling correction operation to increase compared to the time of t4.

As described above, the resulting larger difference between the driving pressures PL, PR of the left and right traveling driving apparatuses 31L, 31R allows a larger difference between the flow amounts QtL, QtR passing through the communicating passages 73L, 73R (throttles 74L, 74R) in the brake valves 44L, 44R to make a significant straight traveling correction operation. Thus, even if the stroke X where significantly mistracking lasts for many hours or the stroke X is smaller than $X_{EO}$ ($X<X_{EO}$) in the Comparative Example, a difference in rotational speed and a difference in driving pressure become smaller, and the continuation of such a long-time mistracking can be suppressed.

At the time of t6, the driving pressure PL of the left traveling driving apparatus 31L exceeds $P_{EO}$ to eliminate deceleration by contracting the opening area $A_{CB}$ of an outlet oil passage of the left counter balance valve 71L. At the time of t7, the driving pressures PL, PR of the left and right traveling driving apparatuses 31L, 31R exceed $P_{FS}$, and the strokes XL, XR of the counter balance valves 71L, 71R correspond to the maximum stroke $X_{FS}$. The resulting smaller difference between the flow amounts QtL, QtR passing through the communicating passages 73L, 73R (throttles 74L, 74R) in the brake valves 44L, 44R decreases the straight traveling correction operation. The series of these operations allow a difference in rotational speed between the left and right traveling driving apparatuses 31L, 31R to be smaller than in the Comparative Example, and mistracking of a working vehicle (hydraulic excavator 1) can be suppressed.

As described above, according to the embodiment, the first communicating passage 73L communicates the first and second supply/discharge passages 25A, 25B when the displacement of the first spool 72L of the first counter balance valve 71L exceeds a predetermined amount ($X_{CM}$). Thus, the first communicating passage 73L doesn't always communicate the first and second supply/discharge passages 25A, 25B (constant opening), but communicates in association with the first counter balance valve 71L (varied opening). In addition, the second communicating passage 73R communicates the third and fourth supply/discharge passages 26A, 26B when the displacement of the second spool 72R of the second counter balance valve 71R exceeds a predetermined amount ($X_{CM}$). Thus, the second communicating passage 73R doesn't always communicate the third and fourth supply/discharge passages 26A, 26B (constant opening), but communicates in association with the second counter balance valve 71R (varied opening). Thus, a difference in rotational speed generated between the first hydraulic motor 32L and the second hydraulic motor 32R (while mistracking) allows the rotational speed of the traveling driving apparatus 31L (31R) on a high rotation side to decrease and increase the rotational speed of the traveling driving apparatus 31R (31L) on a low rotation side. As a result, the effect of correction by rotational speed synchronization (effect of straight traveling correction) can sufficiently be provided, and mistracking by a difference in rotational speed can be suppressed.

In this case, no use of a bleed-off circuit can suppress increases in motor drain pressure. As a result, drawbacks attributed to such increases in motor drain pressure can be reduced. Thus, the trouble of installing a new pipe is saved, and accordingly, cost increase can be reduced. Also, the resulting communication of the supply/discharge passages 25A, 25B, 26A, 26B (more specifically, communication only at the maximum stroke $X_{FS}$), in conjunction with the strokes of the counter balance valves 71L, 71R (in conjunction with the displacement of the spools 72L, 71R), can suppress the effects on the braking performance and starting performance by the traveling driving apparatuses 31L, 31R. As a result, mistracking by a difference in rotational speed between the traveling driving apparatus 31L on one side (left side) (first hydraulic motor 32L) and the traveling driving apparatus 31R on the other side (right side) (second hydraulic motor 32R) can be suppressed with proper timing, while reducing the complexity of the configuration and cost increase.

According to the embodiment, the first communicating passage 73L is provided in the first spool 72L of the first counter balance valve 71L, and the second communicating passage 73R is provided in the second spool 72R of the second counter balance valve 71R. Thus, the communicating passages 73L, 73R can be provided by modifying spools of counter balance valves 71L, 71R in the conventional configuration (by processing spools). Thus, the trouble of installing new parts is saved, and accordingly, cost increase can be reduced. In addition, larger sizes of traveling driving apparatuses 31L, 31R can be avoided.

According to the embodiment, the first throttle 74L is provided on the way of the first communicating passage 73L, while the second throttle 74R is provided on the way of the second communicating passage 73R. The first throttle 74L and the second throttle 74R are set such that a difference between the "flow amount of the pressurized oil traveling between the first hydraulic pump 13 and the first hydraulic motor 32L" and the "flow amount of the pressurized oil traveling between the second hydraulic pump 14 and the second hydraulic motor 32R" is reduced while both the first hydraulic motor 32L and the second hydraulic motor 32R are in rotation. Thus, a difference between the flow amount of the pressurized oil traveling from the first hydraulic pump 13 to the first hydraulic motor 32L and the flow amount of the pressurized oil traveling from the second hydraulic pump 14 to the second hydraulic motor 32R can be suppressed, and a difference in rotational speed between the first hydraulic motor 32L and the second hydraulic motor 32R can be suppressed. In this case, the efficiency degradation by the communicating passages 73L, 73R can be minimized by the throttles 74L, 74R. Also, a throttle capable of ensuring rotational speed synchronization (throttle capable of ensuring straight traveling property) can be selected beforehand, and mounted on the traveling driving apparatuses 31L, 31R. Thus, calibration on a machine with traveling driving apparatuses 31L, 31R mounted thereon, such as calibration on a construction machine (hydraulic excavator 1) is not required, and the resulting work can be simplified.

In addition, in this embodiment, one typical configuration of providing the communicating passages 73L, 73R for the spools 72L, 72R of the counter balance valves 71L, 71R is described. However, in addition to this, the communicating passage 92 may be provided between the spool sliding bore 91 and the spool 93, for example, as shown in modifications in FIGS. 13 and 14. That is, in the modifications, the communicating passage 92 as a communicating oil passage and the throttle 94 are provided between the spool sliding bore 91 and an outer peripheral surface of the spool 93. The communicating passage 92 and the throttle 94 are configured by a groove portion 92A provided on an outer peripheral surface of the outer peripheral surface (large diameter portion 93A at an intermediate position) of the spool 93 and an annular throttle 94A.

Figure 13:
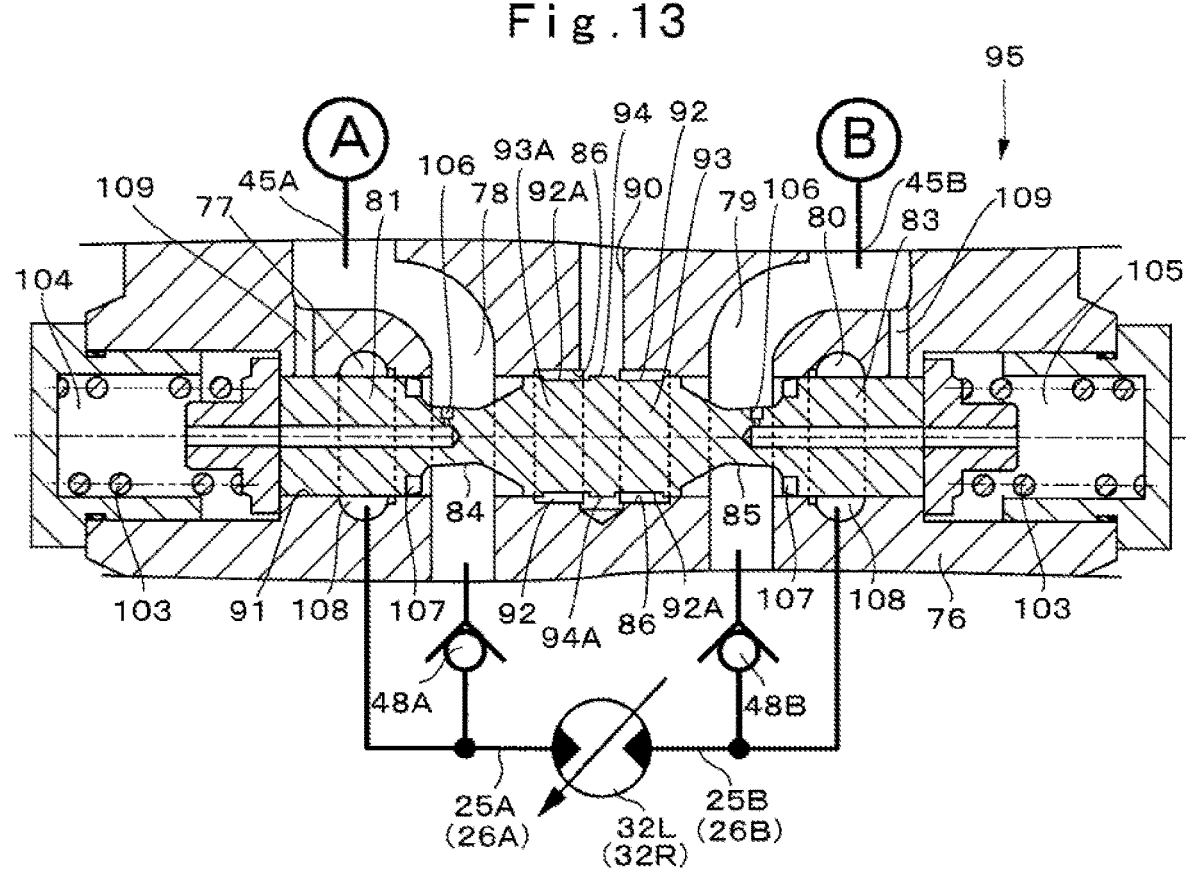
FIG. 13 is a longitudinal sectional view of a counter balance valve according to one modification shown when a spool stroke is at neutral position (O position).
Figure 14:
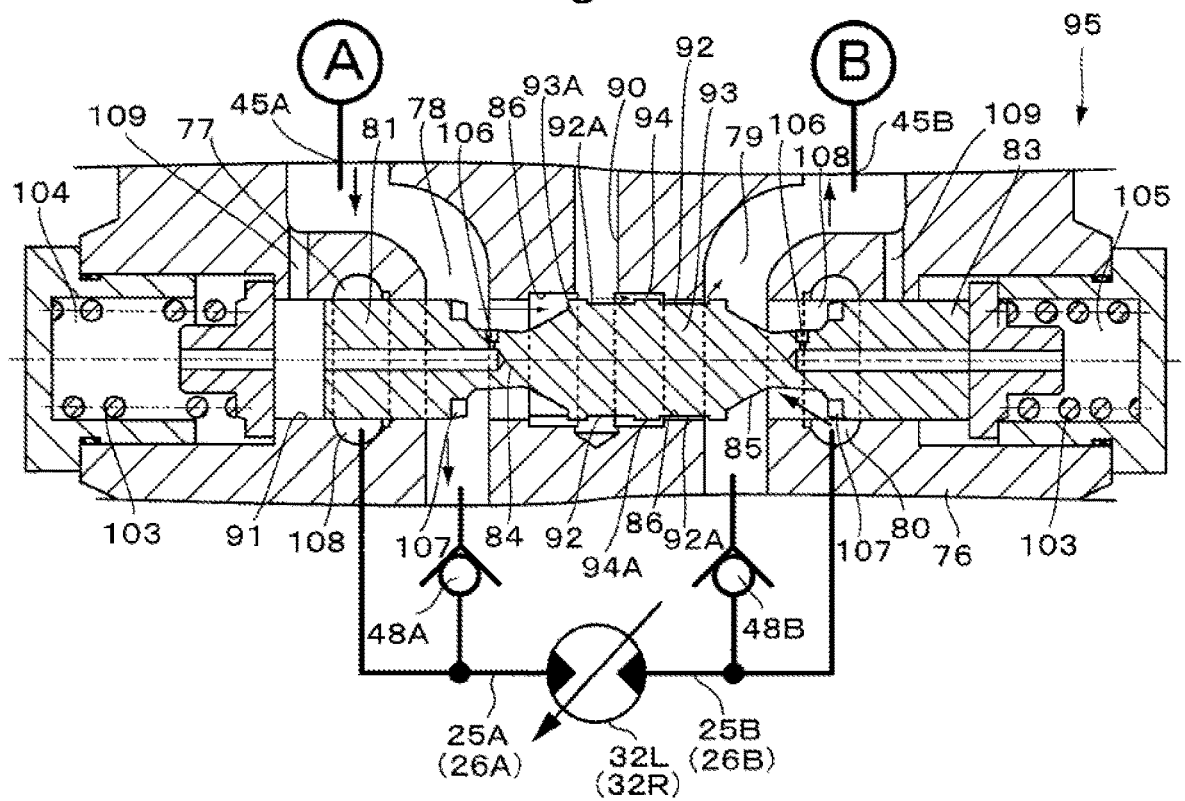
FIG. 14 is a longitudinal sectional view of the counter balance valve shown when the spool stroke is at the full stroke position ($X_{FS}$ position).

As shown in FIG. 13, the communicating passage 92 and the throttle 94 are shut off when the spool 93 is at the neutral position A0, or in case of stroke X=0. As shown in FIG. 14, the left and right valve ports 45A, 45B are communicated through the communicating passage 92 and the throttle 94 when the spool 93 is at the drive position AL2 corresponding to the maximum stroke position $X_{FS}$, or in case of stroke $X=X_{FS}$. Even in the modifications, the pressurized oil having the flow amount Qt corresponding to the driving pressure P travels between the left and right valve ports 45A, 45B through the communicating passage 92 and the throttle 94 when the counter balance valve 95 is at the drive positions AL2, AR2. As a result, mistracking by a difference in rotational speed can be suppressed.

In this embodiment, one example of a configuration of providing communicating oil passages 73L, 73R and throttles 74L, 74R in spools 72L, 72R of counter balance valves 71L, 71R is described. Nevertheless, in addition to this, a communicating passage and a throttle are provided on a housing side (case side) of a counter balance valve, for example, and a communicating passage may be configured to be open or be shut off in conformity with each operation of a counter balance valve. For example, a communicating passage and a throttle may be provided irrespective of a counter balance valve. A communicating passage and a throttle, with or without a counter balance valve mounted, are configured to be open or shut off in association with (a spool of) a counter balance valve. Furthermore, no throttle is described and only a communicating passage may be provided in the configuration.

In this embodiment, one example of hydraulic motors 32L, 32R configured by a swash plate type axial piston hydraulic motor is described. However, the hydraulic motor is not limited to that, and other types of variable displacement hydraulic motors such as an inclined shaft type hydraulic motor and a radial piston hydraulic motor may be used as a hydraulic motor. Moreover a fixed displacement hydraulic motor may also be used in place of a variable displacement hydraulic motor. Hydraulic pumps 13, 14 may also be replaced with other types of hydraulic pumps, for example, fixed displacement ones.

In the embodiment, a traveling hydraulic motor driving a drive wheel 2B of a crawler belt 2D is exemplified as a hydraulic motor. That is, in the embodiment, a traveling hydraulic driving apparatus allowing a lower traveling structure 2 to travel is exemplified as a hydraulic driving apparatus. However, the hydraulic driving apparatus is not limited to that, and the hydraulic motor may be a hydraulic motor driving objects to be driven other than the drive wheel 2B. That is, the hydraulic driving apparatus is not limited to a traveling hydraulic driving apparatus of a construction machine (working vehicle) such as a hydraulic excavator 1, and for example, can widely be employed as a hydraulic driving apparatus that is incorporated in industrial machines and common machinery.

DESCRIPTION OF REFERENCE NUMERALS

11: Hydraulic circuit (hydraulic driving apparatus)
13: First hydraulic pump
14: Second hydraulic pump
15: Hydraulic oil tank
23: Left traveling directional control valve (First directional control valve)
24: Right traveling directional control valve (Second directional control valve)
25A: First left supply/discharge line (First supply/discharge passage)
25B: Second left supply/discharge line (Second supply/discharge passage)
26A: First right supply/discharge line (Third supply/discharge passage)
26B: Second right supply/discharge line (Fourth supply/discharge passage)
32L: Left traveling hydraulic motor (First hydraulic motor)
32R: Right traveling hydraulic motor (Second hydraulic motor)
71L: Left counter balance valve (First counter balance valve)
71R: Right counter balance valve (Second counter balance valve)
72L: Left spool (First spool)
72R: Right spool (Second spool)
73L: Left communicating passage (First communicating passage)
73R: Right communicating passage (Second communicating passage)
74L: First throttle
74R: Second throttle
92: Communicating passage (First communicating passage, second communicating passage)
93: Spool (First spool, Second spool)
94: Throttle (First throttle, Second throttle)
95: Counter balance valve (First counter balance valve, Second counter balance valve)

The invention claimed is:

1. A hydraulic driving apparatus comprising:
a first hydraulic pump and a second hydraulic pump;
a first hydraulic motor rotatively driven by pressurized oil from the first hydraulic pump;
a second hydraulic motor rotatively driven by pressurized oil from the second hydraulic pump;
a pair of first and second supply/discharge passages connecting the first hydraulic pump, a hydraulic oil tank and the first hydraulic motor;
a pair of third and fourth supply/discharge passages connecting the second hydraulic pump, the hydraulic oil tank and the second hydraulic motor;
a first directional control valve provided on the way of the first and second supply/discharge passages and switching the direction of the pressurized oil supplied and discharged between the first hydraulic pump, the hydraulic oil tank and the first hydraulic motor;
a second directional control valve provided on the way of the third and fourth supply/discharge passages and switching the direction of the pressurized oil supplied and discharged between the second hydraulic pump, the hydraulic oil tank and the second hydraulic motor;
a first counter balance valve located between the first directional control valve and the first hydraulic motor, provided on the way of the first and second supply/discharge passages and allowing a first spool to be displaced axially based on a pressure difference between the first and second supply/discharge passages; and
a second counter balance valve located between the second directional control valve and the second hydraulic motor, provided on the way of the third and fourth supply/discharge passages and allowing a second spool to be displaced axially based on a pressure difference between the third and fourth supply/discharge passages, wherein
the first counter balance valve includes a first communicating passage communicating the first and second supply/discharge passages when the displacement of the first spool exceeds a predetermined amount based on a pressure difference between the first and second supply/discharge passages, and the second counter balance valve includes a second communicating passage communicating the third and fourth supply/discharge passages when the displacement of the second spool exceeds a predetermined amount based on a pressure difference between the third and fourth supply/discharge passages.

2. The hydraulic driving apparatus according to claim 1, wherein the first communicating passage is provided in the first spool of the first counter balance valve, and the second communicating passage is provided in the second spool of the second counter balance valve.

3. The hydraulic driving apparatus according to claim 1, wherein a first throttle limiting the flow amount of the pressurized oil circulating in the first communicating passage is provided on the way of the first communicating passage, a second throttle limiting the flow amount of the pressurized oil circulating in the second communicating passage is provided on the way of the second communicating passage, and the first throttle and the second throttle are set such that a difference between the flow amount of the pressurized oil traveling between the first hydraulic pump and the first hydraulic motor and the flow amount of the pressurized oil traveling between the second hydraulic pump and the second hydraulic motor is reduced while both the first hydraulic motor and the second hydraulic motor are in rotation.

* * * * *